(12) United States Patent
Innan et al.

(10) Patent No.: US 9,563,463 B2
(45) Date of Patent: Feb. 7, 2017

(54) COMPUTER SYSTEM AND CONTROL METHOD THEREFOR

(71) Applicant: Hitachi, Ltd., Tokyo (JP)

(72) Inventors: Masataka Innan, Tokyo (JP); Shunji Takubo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/770,593

(22) PCT Filed: Dec. 13, 2013

(86) PCT No.: PCT/JP2013/083499
§ 371 (c)(1),
(2) Date: Aug. 26, 2015

(87) PCT Pub. No.: WO2015/087449
PCT Pub. Date: Jun. 18, 2015

(65) Prior Publication Data
US 2016/0004552 A1 Jan. 7, 2016

(51) Int. Cl.
G06F 9/455 (2006.01)
G06F 9/50 (2006.01)
H04L 29/08 (2006.01)

(52) U.S. Cl.
CPC ......... G06F 9/45558 (2013.01); G06F 9/5088 (2013.01); H04L 67/1008 (2013.01);
(Continued)

(58) Field of Classification Search
None
See application file for complete search history.

(56) References Cited

U.S. PATENT DOCUMENTS 8,489,744 B2 * 7/2013 Elyashev ............ H04L 67/1002
709/226
2007/0271560 A1 11/2007 Wahlert et al.
(Continued)

FOREIGN PATENT DOCUMENTS

JP 2009-199395 A 9/2009
JP 2009-537894 A 10/2009
(Continued)

OTHER PUBLICATIONS

PCT International Search Report on application PCT/JP2013/083499 mailed Jan. 14, 2014; 3 pages.
(Continued)

*Primary Examiner* — Emerson Puente
*Assistant Examiner* — Zhi Chen
(74) *Attorney, Agent, or Firm* — Foley & Lardner LLP

(57) ABSTRACT

A computer system includes a plurality of server apparatus, a plurality of storage apparatus, a management computer, and a management computer. The management computer stores a server rank which represents a rank of a throughput of a server apparatus, and a storage rank which represents a rank of a throughput of a storage apparatus. Each of the plurality of server apparatuses executes a plurality of virtual machines, and stores a required server rank and a required storage rank. If it is determined that a virtual machine should be migrated on the basis of a load on the plurality of virtual machines, the management computer selects a server apparatus having a server rank equal to the required server rank as a destination server apparatus, and selects a storage apparatus having a storage rank equal to the required storage rank as a destination storage apparatus.

11 Claims, 25 Drawing Sheets

(52) U.S. Cl.
CPC .. *H04L 67/1097* (2013.01); *G06F 2009/4557* (2013.01); *G06F 2009/45583* (2013.01); *G06F 2009/45595* (2013.01)

(56) References Cited

U.S. PATENT DOCUMENTS

| | | | | |
|---|---|---|---|---|
| 2008/0163239 A1* | 7/2008 | Sugumar | ............... | G06F 9/5088 718/105 |
| 2011/0022812 A1* | 1/2011 | van der Linden | .... | G06F 9/5077 711/163 |
| 2013/0055260 A1* | 2/2013 | Zlotkin | ............... | G06F 9/45533 718/1 |
| 2013/0138686 A1* | 5/2013 | Takahashi | ......... | G06F 17/30516 707/769 |
| 2013/0346615 A1* | 12/2013 | Gondi | .................. | G06F 9/5016 709/226 |
| 2015/0019301 A1* | 1/2015 | Jung | ................ | G06Q 10/06393 705/7.39 |

FOREIGN PATENT DOCUMENTS

| | | |
|---|---|---|
| JP | 2011-070464 A | 4/2011 |
| JP | 2013-239095 A | 11/2013 |

OTHER PUBLICATIONS

Written Opinion of the International Searching Authority on application PCT/JP2013/083499 mailed Jan. 14, 2014; 4 pages (with partial English translation).

\* cited by examiner

Fig. 5

Server QoS rank definition table
510

511    512

| Server QoS Rank | Evaluation value Ea |
|---|---|
| Rank 3 | EaR3 < Ea |
| Rank 2 | EaR2 < Ea ≤ EaR3 |
| Rank 1 | Ea ≤ EaR2 |

Fig. 6

Storage QoS rank definition table
520

521

|  |  | Evaluation value Eb | | |
|---|---|---|---|---|
|  |  | Eb < EbR2 | EbR2 < Eb ≤ EbR3 | EbR3 ≤ Eb |
| Evaluation value Ec | EcR3 < Ec | Rank 3 | Rank 2 | Rank 1 |
|  | EcR2 < Ec ≤ EcR3 | Rank 2 | Rank 2 | Rank 1 |
|  | Ec ≤ EcR2 | Rank 1 | Rank 1 | Rank 1 |

SLA management table
730

| Virtual machine ID | Server QoS Rank | Storage QoS Rank | Storage Capacity |
|---|---|---|---|
| 100001 | Rank 3 | Rank 3 | 500 MB |
| 100002 | Rank 3 | Rank 1 | 1 GB |
| 100003 | Rank 3 | Rank 2 | 5 GB |
| ... | ... | ... | ... |

QoS rank management table
610

| Server QoS Rank = 3 | Storage QoS Rank = 2 | | |
|---|---|---|---|
| Evaluation value Ea threshold Ta3 | Evaluation value Eb threshold Tb2 | Evaluation value Ec threshold Tc2 | Free storage capacity threshold Tfs2 |
| AR3 x 80% | B1R2 x 80% | B2R2 x 80% | Storage Capacity x 80% |

VM load monitoring table
620

621 622 623 624 625 626 627 628

| Server ID | Virtual machine ID | Time point | Input-output performance (IOPS) total | Input-output performance (IOPS) threshold | Transfer performance (MB/s) total | Transfer performance (MB/s) threshold | Threshold exceedance [Y / N] |
|---|---|---|---|---|---|---|---|
| 001 | 001-001 | 00:00:00:00 | | | | | |
| | | | | | | | |

Fig. 10

Physical resource load monitoring table
740

| Server ID | Time point | Maximum throughput | Average throughput threshold | Input-output performance (IOPS) total | Input-output performance (IOPS) threshold | Transfer performance (MB/s) total | Transfer performance (MB/s) threshold | Threshold exceedance [ Y / N ] |
|---|---|---|---|---|---|---|---|---|
| 001 | 00:00:00:00 |  |  |  |  |  |  |  |
|  |  |  |  |  |  |  |  |  |

VM load management table
750

| Server ID | Virtual machine ID | Server QoS Rank | Storage QoS Rank | Time | Input-output performance (IOPS) | Transfer performance (MB/s) |
|---|---|---|---|---|---|---|
| 001 | 001-001 | Rank 3 | Rank 3 | 00:00:00:00 | XXX | YYY |
|  | 001-002 | Rank 3 | Rank 2 | 00:00:00:00 | XXX | YYY |
| 002 | 002-003 | Rank 1 | Rank 3 | 00:00:00:00 | XXX | YYY |
| ... | ... | ... | ... | ... | ... | ... |

Per-rank server list list 570

| Server QoS Rank | Server ID | HOST OS # |
|---|---|---|
| Rank 3 | 03 | XX |
|  | 04 | XX |
|  | ... | ... |
| Rank 2 | 02 | XX |
|  | 05 | XX |
|  | ... | ... |
| Rank 1 | 01 | XX |

571 — Server QoS Rank
572 — Server ID
573 — HOST OS #

Fig. 13

Server resource management table
760

| Server ID | Server QoS Rank | Allowable number of VMs $A_{VM}$ | Number of operating VMs $B_{VM}$ | Evaluation value $Ed = B_{VM} / A_{VM}$ |
|---|---|---|---|---|
| 01 | | | | |
| 02 | | | | |
| ... | | | | |

Storage resource management table
770

| Storage Apparatus ID | LU# | Storage QoS Rank | Maximum $\alpha_{MBPS}$ MB/s | Average $\beta_{MBPS}$ MB/s | Evaluation value Ee $= \beta_{MBPS} / \alpha_{MBPS}$ | Maximum $\alpha_{IOPS}$ IOPS | Average $\beta_{IOPS}$ IOPS | Evaluation value Ef $= \beta_{IOPS} / \alpha_{IOPS}$ | Storage capacity $\alpha_{Cap}$ | Free storage capacity $\beta_{Cap}$ |
|---|---|---|---|---|---|---|---|---|---|---|
| 001 | 0 | | | | | | | | | |
| | 1 | | | | | | | | | |
| | ... | | | | | | | | | |
| 002 | 0 | | | | | | | | | |
| | ... | | | | | | | | | |
| ... | ... | | | | | | | | | |

Server resource candidate list 530

| Server ID | Server QoS Rank | Evaluation value Ed |
|---|---|---|
| 01 | XX | |
| 02 | XX | |

Fig. 16

Storage resource candidate list
540

| Storage | | Storage QoS Rank | Evaluation value Ee | Evaluation value Ef | Free storage capacity $\beta_{Cap}$ |
|---|---|---|---|---|---|
| Apparatus ID | LU# | | | | |
| 002 | 00 | | | | |
| | 02 | | | | |
| ... | ... | | | | |

Destination server resource candidate list
550

| HOST OS # | Server ID | Server QoS Rank | Evaluation value Ed |
|---|---|---|---|
| 002 | 01 | XX | |
|  | 02 | XX | |
| 003 | 05 | XX | |
|  | 08 | XX | |
|  | 12 | XX | |
| ... | | | |

Destination storage resource candidate list
560

| HOST OS # | Storage Apparatus ID | LU# | Storage QoS Rank | Evaluation value Ee | Evaluation value Ef | Free storage capacity $\beta_{Cap}$ |
|---|---|---|---|---|---|---|
| 002 | 002 | 00 | | | | |
| | | 02 | | | | |
| 003 | 004 | 06 | | | | |
| ... | ... | ... | | | | |

561  562  563  564  565  566  567

COMPUTER SYSTEM AND CONTROL METHOD THEREFOR

TECHNICAL FIELD

The present invention relates to a technology of managing a computer system.

BACKGROUND ART

A virtualization function such as a server virtualization and a storage virtualization, is provided and installed to a range of systems, as a means for realizing to effectively utilize and simply manage physical resources of a computer system.

The server virtualization technology operates a virtual server (VM: Virtual Machine) on a physical server. As a result, a plurality of VMs may be operated on a single physical server, and VMs may be migrated between physical servers.

At the same time, the storage virtualization technology makes possible the virtual management of a plurality of physical storage apparatuses as a single storage apparatus, and also makes possible the allocation of the virtualized resources to a server. Furthermore, the storage virtualization technology makes possible the virtual partitioning of a single storage apparatus into a plurality of storage apparatuses, and the provision thereof to a server. In addition, the storage virtualization technology makes possible the formation of a virtual logical volume equal to or larger than the physical storage capacity.

The number of VMs operating on each physical server continues to increase, and VM management operations have become cumbersome and complex as a result. As virtual systems configured from servers and storage with different specifications (performance, bandwidth, etc.) increase, a huge number of VMs startup/provide services/migrate/shut down on clusters of computer resources that are also geographically scattered.

In addition to this, a technology is known in which, if the load on a VM increases while it is being executed on a certain physical server, the VM is migrated to a different physical server in order to maintain the performance of VM. PTL 1 is known as a server management technology that makes possible the relocation of a virtual server based on preconfigured design concepts. Using this technology allows a cluster configuration to be maintained during relocation, by monitoring performance information, etc., for each virtual server.

CITATION LIST

Patent Literature

PTL1: Japanese Unexamined Patent Application Publication No. 2009-199395

SUMMARY OF INVENTION

Technical Problem

Since, however, high-load VMs are subject to frequent data access, significant processing of data in the memory and a large number of checks on data consistency, etc., will be required when migrating a high-load VM. In other words, migrating a high-load VM further increases the load on the physical server, and as such it is difficult to migrate high-load VMs. As a result, it is difficult to maintain VM performance.

Furthermore, when migrating a VM, it is necessary to select an appropriate destination resource for the VM from among a vast array of physical resources having different specifications. At this point, it is difficult to search for a destination resource that can maintain the performance of the VM. Additionally, as the number of VMs increases, it becomes more difficult for the administrator to select a destination resource.

The technology described in PTL 1 maintains a cluster configuration during the relocation of virtual servers, but does not solve the issue discussed herein.

Solution to Problem

In order to solve the problem described above, a computer system according to an aspect of the present invention, comprises: a plurality of server apparatuses; a plurality of storage apparatuses which are coupled to the plurality of server apparatuses via a primary communications network; and a management computer which is coupled to the plurality of server apparatuses and the plurality of storage apparatuses via a secondary communications network. The management computer stores a server rank which is configured for each of the plurality of server apparatuses and represents a rank of a throughput of a server apparatus, and a storage rank which is configured for each of the plurality of storage apparatuses and represents a rank of a throughput of a storage apparatus. Each of the plurality of server apparatuses executes a plurality of virtual machines, and stores a required server rank which is a server rank of a server apparatus allocated to each of the plurality of virtual machines, and a required storage rank which is a storage rank of a storage apparatus allocated to each of the plurality of virtual machines, and determines, on the basis of the load on the plurality of virtual machines, whether or not to migrate the virtual machine. When the migration is determined, a target virtual machine is selected from among a plurality of virtual machines on the basis of the load on the plurality of virtual machines, and target virtual machine information, which represents the required server rank and required storage rank for the target virtual machine, is transmitted to the management computer. In response to the target virtual machine information, the management computer selects, as the destination server apparatus, a server apparatus having a server rank equal to the required server rank of the target virtual machine, from among the plurality of server apparatuses, and selects, as a destination storage apparatus, a storage apparatus having a storage rank equal to the required storage rank of the target virtual machine from among the plurality of storage apparatuses. Destination information representing the destination server apparatus and the destination storage apparatus, is transmitted to the target server apparatus executing the target virtual machine. The target server apparatus migrates the target virtual machine to the destination server apparatus and the destination storage apparatus, on the basis of the destination information.

Advantageous Effects of Invention

According to an aspect of the present invention, it is possible to maintain the performance of a virtual machine, by migrating an appropriate target virtual machine for

BRIEF DESCRIPTION OF DRAWINGS

FIG. 5 depicts a configuration of a server QoS rank definition table 510.

FIG. 6 depicts a configuration of a storage QoS rank definition table 520.

FIG. 7 depicts a configuration of an SLA management table 730.

FIG. 10 depicts a configuration of a physical resource load monitoring table 740.

FIG. 11 depicts a configuration of a VM load management table 750.

FIG. 12 depicts a configuration of a per-rank server resource list 570.

FIG. 13 depicts a configuration of a server resource management table 760.

FIG. 14 depicts a configuration of a storage resource management table 770.

FIG. 15 depicts a configuration of a server resource candidate list 530.

FIG. 16 depicts a configuration of a storage resource candidate list 540.

FIG. 17 depicts a configuration of a destination server resource candidate list 550.

FIG. 18 depicts a configuration of a destination storage resource candidate list 560.

DESCRIPTION OF EMBODIMENTS

The following is a description of an embodiment of the present invention with reference to the diagrams.

When an in-place VM requires migration, a computer system according to the present embodiment selects an appropriate destination resource from among a plurality of candidate destination resources. Cases where a VM requires migration may include, for example, cases where loads have been concentrated on a particular physical apparatus, and the physical apparatus is not able to meet the performance requirements of a VM operating thereon, or cases where a physical apparatus is being renewed due to aging, or cases where the physical apparatus is being upgraded to improve performance.

In the present embodiment, a resource is selected and the target VM for migration is migrated thereto, in order to maintain VM service level when the load on a particular physical apparatus becomes high. Furthermore, in the present embodiment, a VM having a low load, operating on the same server, is migrated in order to maintain the service level of the high-load VM.

Figure 1:
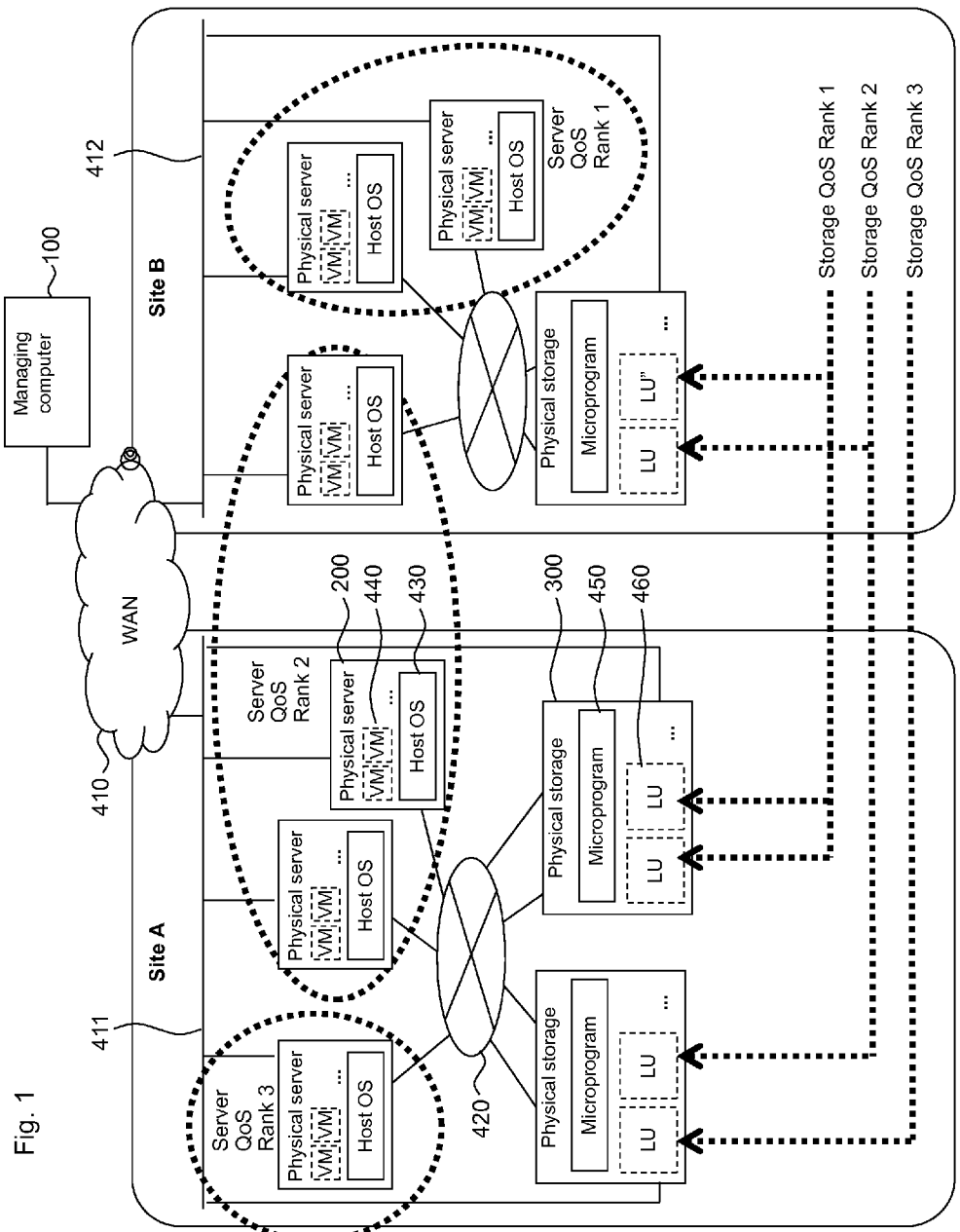
FIG. 1 depicts a configuration of a computer system according to an embodiment of the present invention.

FIG. 1 depicts a configuration of the computer system according to an embodiment of the present invention.

This computer system comprises a management computer 100, a plurality of physical servers 200, and a plurality of physical storages 300. The management computer 100 is coupled, via a communications network 410, comprising a WAN (Wide Area Network) or a LAN (Local Area Network), etc., to the plurality of physical servers 200 and physical storages 300. The plurality of physical servers 200 are coupled via a communications network 420, comprising a SAN (Storage Area Network), etc., to the plurality of physical storages 300. In this example, some of the plurality of physical servers 200 and some of the plurality of physical storages 300 are provided on a site A, while the remaining physical servers 200 and physical storages 300 are provided on a site B. The management computer 100 is mutually coupled via a WAN to the physical server 200 and the physical storage 300 in the site A, and the physical server 200 and the physical storage 300 in the site B.

The physical server 200 executes a host OS (Operating System) 430. Alternatively, a plurality of physical servers 200 in a single enclosure may execute a single host OS 430. Furthermore, the physical server 200 executes a VM 440 on the host OS 430. The physical storage 300 executes a microprogram 450. Furthermore, the physical storage 300 is configured with an LU (Logical Unit: logical volume) 460 by the management computer 100. The VM 440 reads and writes files in regard to the allocated LU. Hereinafter, each physical server 200 may in some cases be referred to as a "server resource", and each LU within the physical storage 300 referred to as a "storage resource". Furthermore, server resource performance may be referred to as "server QoS (Quality of Service)", and storage resource performance as "storage QoS".

The management computer 100 configures the server QoS rank, which represents the rank of the server QoS, to the physical server 200, and the storage QoS rank, which represents the rank of the storage QoS, to the physical storage 300 on the basis of input by the administrator. In the present embodiment, the server QoS rank is expressed between 1 and 3, with higher numbers representing a higher level of quality. In the present embodiment, the storage QoS rank is expressed between 1 and 3, with higher numbers representing a higher level of quality. Furthermore, the management computer 100 configures an SLA (Service Level Agreement) including server QoS rank and a storage QoS rank to VMs, on the basis of input by the administrator. Subsequently, when migrating a VM, the management computer 100 selects a resource that provides the VM with the same SLA after migration as that prior to migration, and migrates the VM. Some of the business applications executed by the VM 440 use the storage resource but hardly use the server resource. The SLA, which is separated into the server QoS rank and storage QoS, is configured in order to be applicable to such cases. If the administrator introduces a physical server 200 having higher performance than the maximum defined server QoS rank, an additional server QoS rank higher than the maximum defined server QoS rank may be defined. Additionally, in regard to the storage QoS, if the administrator introduces physical storage 300 having higher performance than the maximum defined storage QoS rank, an additional storage QoS rank higher than the maximum defined storage QoS rank may be defined.

The following is a description of a method of configuring the server QoS rank. When introducing the physical servers 200, the management computer 100 configures a server QoS rank to the physical server 200 in consideration of the number of CPUs (Central Processing Units) of the physical server 200, cores thereof, and threads thereof, and the acceptable number of VMs thereof, on the basis of input by the administrator. The management computer 100, for example, by dividing the total throughput of the physical server 200 by the allowable number of VMs, calculates the throughput that can be allocated to each VM, and assigns a rank on the basis of the throughput. In this case, the server resource is expressed in terms of throughput and the server QoS is expressed in terms of in server resource utilization.

The following is a description of a method of configuring the storage QoS rank. When introducing the physical storage 300, and particularly when configuring an LU to the physical storage 300, the management computer 100 configures the storage QoS rank to the physical storage 300 in consideration of the data transfer performance and transfer volume to the LU, on the basis of input by the administrator. The management computer 100, for example, calculates the maximum data transfer performance and transfer volume (bandwidth) from the type of media constituting the LU and the number of units of the media, and considers resource utilization (bandwidth utilization), which represents the extent to which storage resource is utilized with respect to the maximum data transfer performance and transfer volume. Types of media include an SSD (Solid State Drive) and an HDD (Hard Disk Drive), etc. In this case, storage resources are expressed in bandwidth, and storage QoS is expressed in resource utilization of the storage resource.

The management computer 100 configures SLA for each VM when creating VMs on the basis of input by the administrator. Each VM retains the SLA configured to each VM, as well as retaining a threshold in regard to VM load.

The following is an outline description of the operation of the computer system according to the present embodiment.
(S1) Each VM 440 is configured to monitor its own load.
(S2) Each VM 440 is configured to notify a local host OS 430 when a load reaches the threshold.
(S3) On receiving notification, the host OS 430 refers to the resource utilization of a local physical server 200 and the resource utilization of the physical storage, and confirms whether either resource utilization level has reached the preconfigured threshold.
(S4) If resource utilization exceeds the threshold, the host OS 430 selects the VM 440, which is the target VM for migration. At this point, the host OS 430 preferentially selects a VM with a low SLA and low load as the target VM for migration.
(S5) The host OS 430 requests the management computer 100 to select a destination resource for the selected target VM for migration.
(S6) The management computer 100 confirms the SLA of the target VM for migration, and sends an inquiry to the other a plurality of managed host OSs 430 which do not request, to find a resource with the same SLA as the target VM for migration.
(S7) The other host OSs which has received the inquiry, search for a resource available as a destination and reply the result of the search to the management computer 100.
(S8) On receiving a reply from the other host OSs, the management computer 100 selects a destination resource from among available resources, prioritizing a physical server 200 with low VM operating ratio, and a physical storage 300 with low bandwidth utilization.
(S9) The management computer 100 executes the migration of the VM to the selected destination resource.

This makes it possible to specify a service level to the VM 440, so that the VM is migrated automatically when the load on the VM 440 increases. As a result, it is possible to operate with maintaining the VM 440 service level without increasing the burden placed on the administrator to select a destination resource, etc., even with a massive number of VMs 440.

The following is a description of the configuration of the computer system.

Figure 2:
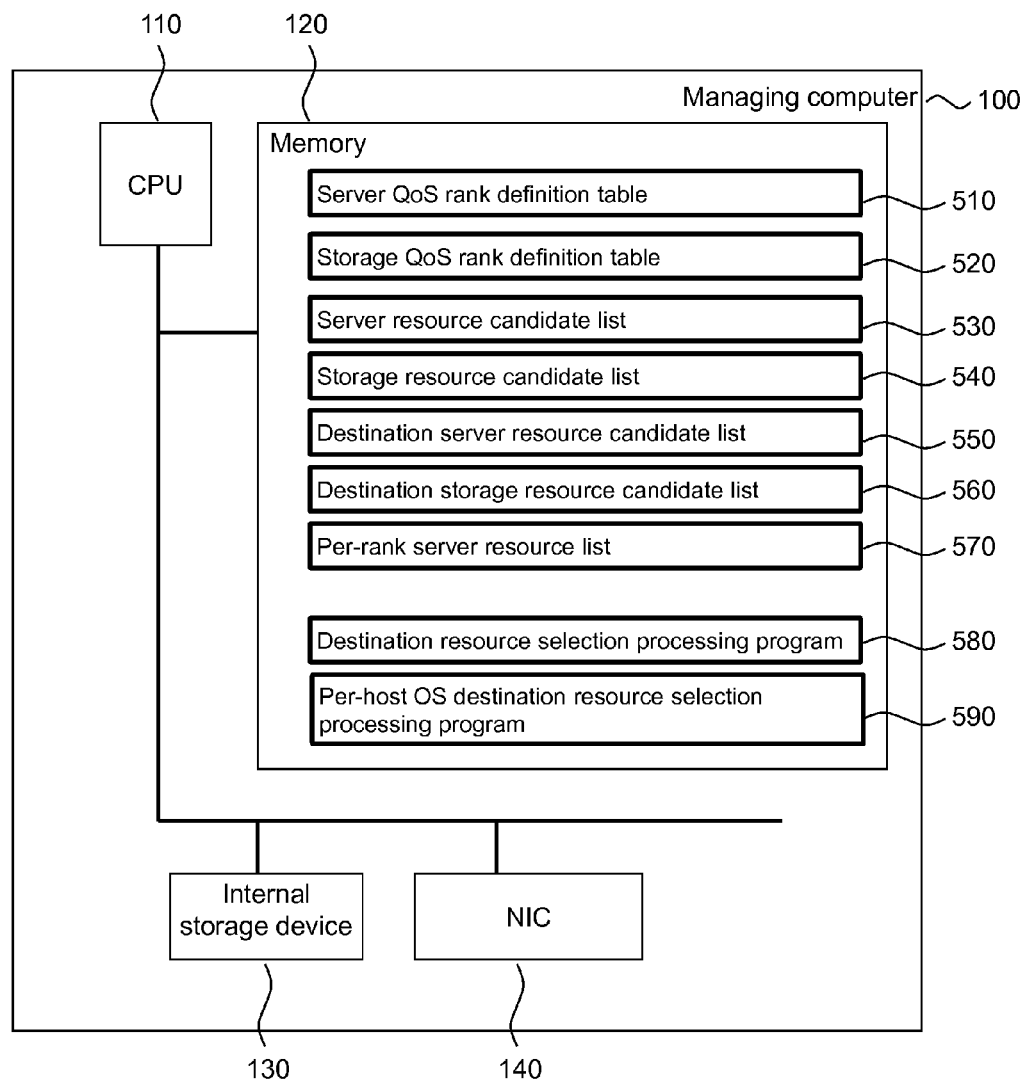
FIG. 2 depicts a configuration of a management computer 100.

FIG. 2 depicts a configuration of the management computer 100.

The management computer 100 comprises a CPU 110, a memory 120, an internal storage device 130, and a NIC (Network Interface Card) 140. The memory 120 and the internal storage device 130 store the programs and data used in processes of the management computer 100. The internal storage device 130 can take the form of an HDD, an SSD, etc. The CPU 110 executes the processes of the management computer 100, in line with the programs and data in the memory 120 and the internal storage device 130. The NIC 140 communicates with the physical server 200 and the physical storage 300 via the communications network 410.

In addition, the memory 120 stores a server QoS rank definition table 510, a storage QoS rank definition table 520, a server resource candidate list 530, a storage resource candidate list 540, a destination server resource candidate list 550, a destination storage resource candidate list 560, a per-rank server resource list 570, a destination resource selection processing program 580, and a per-host OS destination resource selection processing program 590. These data and programs are described below.

Figure 3:
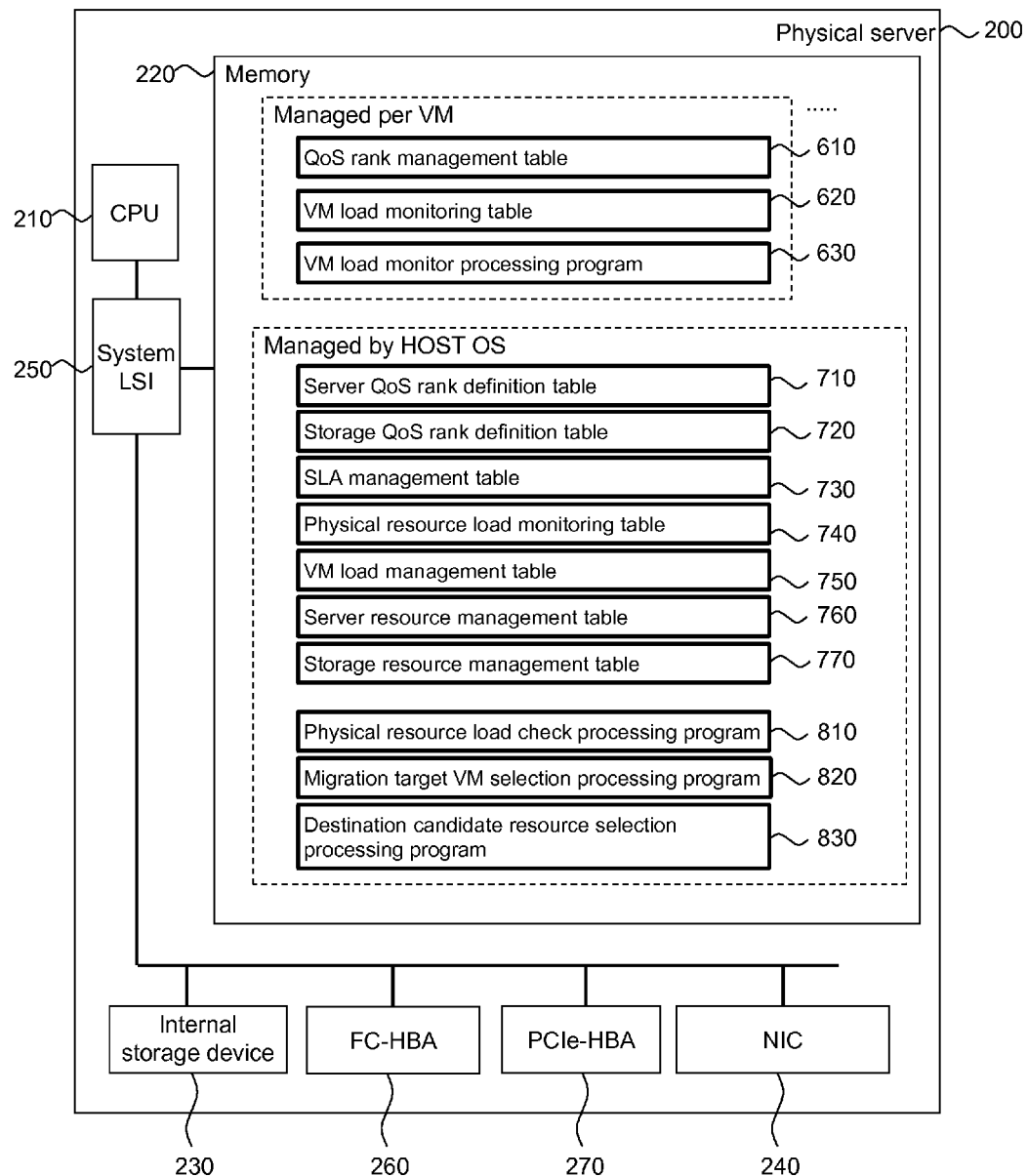
FIG. 3 depicts a configuration of a physical server 200.

FIG. 3 depicts the configuration of the physical server 200.

The physical server 200 comprises a CPU 210, a memory 220, an internal storage device 230, a NIC (Network Interface Card) 240, a system LSI (Large Scale Integration) 250, an FC (Fibre Channel)-HBA (Host Bus Adapter) 260, and a PCIe (Peripheral Component Interconnect express)-HBA 270. The memory 220 and the internal storage device 230 store the programs and data used in processes of the physical server 200. The internal storage device 230 can take the form of an HDD, an SSD, etc. The CPU 210 executes processes of the physical server 200, in line with the programs and data in the memory 220 and the internal storage device 230. The NIC 240 communicates with the management computer 100 and another physical server 200 via the communications network 410. The system LSI 250 couples the CPU 210 to other components, and controls communication therebetween. The FC-HBA 260 communicates with the physical storage 300 via an FC interface. The PCIe-HBA 270 communicates with the physical storage 300 via a PCIe interface.

Furthermore, the memory 220 stores data and programs managed by the VM 440. The data and programs managed by the VM 440 are a QoS rank management table 610, a VM load monitoring table 620, and a VM load monitor processing program 630.

In addition, the memory 220 stores the data and programs managed by the host OS 430. The data and programs managed by the host OS 430 are a server QoS rank definition table 710, a storage QoS rank definition table 720, an SLA management table 730, a physical resource load monitoring table 740, a VM load management table 750, a server resource management table 760, a storage resource management table 770, a physical resource load check processing program 810, a migration target VM selection processing program 820, and a destination candidate resource selection processing program 830. These data and programs may also be managed by using a hypervisor.

Figure 4:
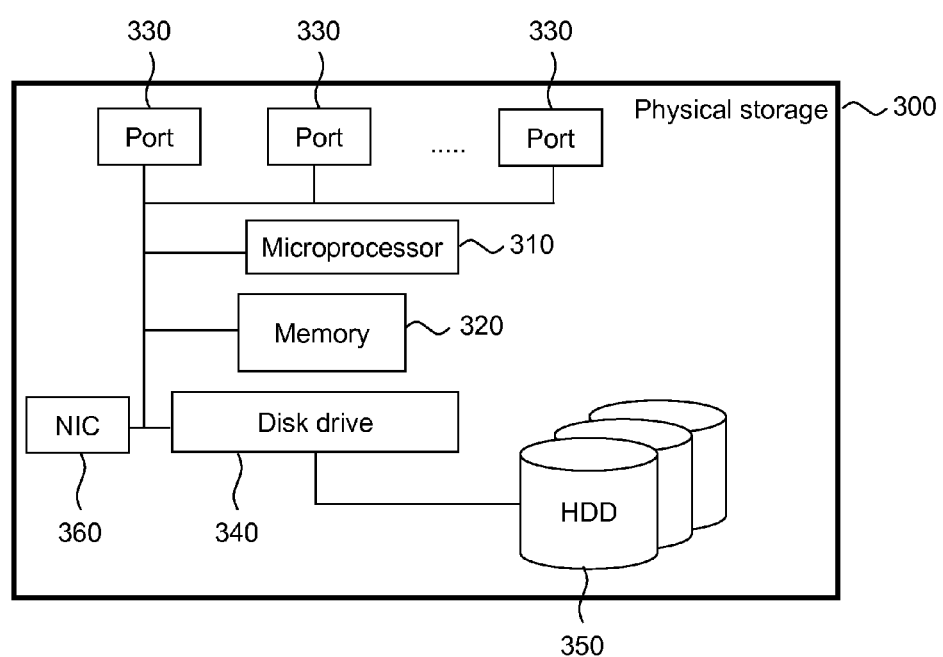
FIG. 4 depicts a configuration of a physical storage 300.

FIG. 4 depicts the configuration of the physical storage 300.

The physical storage 300 comprises a microprocessor 310, a memory 320, a plurality of ports 330, a disk drive 340, an HDD 350, and a NIC 360. The memory 320 stores the programs and data for the processes of the physical storage 300. The microprocessor 310 executes the processes of the physical storage 300 in line with the programs and data in the memory 320. The port 330 communicates with the physical servers 200 by using communications interfaces such as an FC and a PCIe. The disk drive 340 communicates with the HDD 350 in accordance with instructions from the microprocessor 310. The HDD 350 writes data received from the disk drive 340 and transmits read data to the disk drive 340. The NIC 360 communicates with the management computer 100 via the communications network 410 in accordance with instructions from the microprocessor 310.

The following is a description of the data within the computer system.

FIG. 5 depicts the configuration of the server QoS rank definition table 510.

The server QoS rank definition table 510 is not only stored in the management computer 100, the server QoS is also stored in the physical server 200 by the host OS 430 in the form of the server QoS rank definition table 710. The server QoS rank definition table 510 is configured by the administrator, and defines the relationship between the server QoS rank and physical server 200 evaluation values.

The server QoS rank definition table 510 stores a range 512 of an evaluation value Ea corresponding to each of the three values of server QoS rank 511. The evaluation value Ea represents throughput per single VM, expressed, for example, in terms of the number of CPUs of the physical server 200×the number of cores thereof×the number of threads thereof/the allowable number of VMs thereof. At this point, Ea R2, which is a lower limit value of Ea when the server QoS rank is 2, is configured, and Ea R3, which is a lower limit value of Ea when the server QoS rank is 3, is configured. The range 512 uses the EaR2 and EaR3 to define a range of the evaluation value Ea corresponding to the server QoS rank 511.

When the management computer 100 changes the server QoS rank definition table 510, the contents subsequent to the change are reflected to the server QoS rank definition table 710 for all the physical servers 200.

FIG. 6 depicts the configuration of the storage QoS rank definition table 520.

The storage QoS rank definition table 520 is stored in the management computer 100, and also stored by the host OS 430 in the physical server 200 in the form of the storage QoS rank definition table 720. The storage QoS rank definition table 520 is configured by the administrator, and defines the relationship between the storage QoS rank and the evaluation value of the physical storage 300.

The storage QoS rank definition table 520 defines a plurality of ranges 521 of an evaluation value Eb and a plurality of ranges 522 of an evaluation value Ec, and stores storage QoS rank values for each of the plurality of combinations of the range 521 and range 522. The evaluation value Eb represents the maximum input/output performance per single VM, and is the value obtained by dividing the maximum input/output performance, expressed as input/output frequency (IOPS: Input/Output per Second), which is the number of input/output commands processed by the physical storage 300 per unit of time, by the acceptable number of VMs. The evaluation value Ec represents the maximum transfer performance per single VM, and is the value obtained by dividing the maximum transfer performance expressed as the transfer speed (MB/s) of the physical storage 300 by the acceptable number of VMs. A lower limit value EbR2 of a second range of the Eb, a lower limit value EbR3 of a third range of the Eb, a lower limit value EcR2 of a second range of the Ec, and a lower limit value EcR3 of a third range of the Ec are configured at this point. The range 521 defines three ranges by using the EbR2 and EbR3. Furthermore, the range 522 defines three ranges by using the EcR2 and EcR3.

The storage QoS rank definition table 520 may also define storage QoS rank, on the basis of a RAID (Redundant Arrays of Independent Disks) level, a data protection level (snapshot, local copy, remote copy, backup, etc.), encryption, compression, and deduplication. For example, the storage QoS rank may be raised as the physical storage 300 has a higher speed RAID level. In addition, the storage QoS rank may be raised as the quantity of data duplicated in the actual volume within the physical storage 300 becomes larger. Furthermore, the storage QoS rank may be raised as the speed of recovery when a failure occurs becomes faster, for example, in a case where the physical storage 300 data has been duplicated to the same site. In addition, the storage QoS rank may be raised if the LU is an encrypted volume. Additionally, if the LU is a compressed volume, or a deduplicated volume, etc., the storage QoS rank may be lowered.

FIG. 7 depicts the configuration of the SLA management table 730.

The SLA management table 730 is stored by the host OS 430 in the physical server 200. The SLA management table 730 is configured by the administrator, and represents the SLA configured for each VM 440.

The SLA management table 730 comprises an entry for each VM. The entry corresponding to a single VM stores a virtual machine ID 731 representing the VM, a server QoS rank 732 configured for the VM, a storage QoS rank 733 configured for the VM, and a capacity (a storage capacity) 734 allocated to the VM. In this way, the SLA configured for each VM is expressed by using the server QoS rank 732, the storage QoS rank 733, and the storage capacity 734.

Figure 8:
FIG. 8 depicts a configuration of a QoS rank management table 610.

FIG. 8 depicts the configuration of the QoS rank management table 610.

The QoS rank management table 610 is stored by the host OS 430 in the physical server 200. The QoS rank management table 610 is configured by the administrator, and represents the threshold of the evaluation value used to determine a load on the VM 440. When the management computer 100 modifies the QoS rank management table 610, the modified contents are reflected in the QoS rank management tables 610 of all the physical servers 200.

The QoS rank management table 610 stores a threshold Ta3 of the evaluation value Ea when server QoS rank is 3, a threshold Tb2 of the evaluation value Eb when storage QoS rank is 2, a threshold Tc2 of the evaluation value Ec, and a threshold Tfs2 of free storage capacity, which is the size of the free area. The threshold Ta3 is, for example, the value obtained by multiplying the lower limit value EaR3 of the range of the evaluation value Ea by a predetermined percentage (in this example, 80%). The threshold Tb2 is, for example, the value obtained by multiplying the lower limit value EbR2 of the range of the evaluation value Eb by a predetermined percentage (in this example, 80%). The threshold Tc2 is, for example, the value obtained by multiplying the lower limit value EcR2 of the range of the evaluation value Ec by a predetermined percentage (in this example, 80%). The threshold Tfs2 is, for example, the value obtained by multiplying the storage capacity 734 in the SLA management table 730 by a predetermined percentage (in this example, 80%).

Figure 9:
FIG. 9 depicts a configuration of a VM load monitoring table 620.

FIG. 9 depicts the configuration of the VM load monitoring table 620.

The VM load monitoring table 620 is stored in the physical server by the VM 440 on each of the physical servers 200. The VM 440 measures a load on the VM 440, and stores the measurement result on the VM load monitoring table 620.

The VM load monitoring table 620 represents a server ID 621 representing the physical server, a virtual machine ID 622 representing the VM, a time point 623 at which the VM QoS was measured, an input/output performance total 624 which is the total input/output performance (IOPS) of the VM measured at the time point, an input/output performance threshold 625 which is the input/output performance (IOPS) threshold of the VM, a transfer performance total 626 which is the total transfer performance (MB/s) of the VM measured at the time point, a transfer performance threshold 627 which is the transfer performance (MB/s) threshold of the VM, and a threshold exceedance 628, which is the result determined at the time point.

The input/output performance threshold 625 is the value obtained by dividing the physical server maximum input/output performance by the number of VMs operating on the physical server. The transfer performance threshold 627 is the value obtained by dividing the maximum transfer performance of the physical server by the number of VMs operating on the physical server. The threshold exceedance 628 represents Y in the case that the input/output performance total 624 exceeds the input/output performance threshold 625, or the transfer performance total 626 exceeds the transfer performance threshold 627, and N at other times.

FIG. 10 depicts the configuration of the physical resource load monitoring table 740.

The physical resource load monitoring table 740 is stored in the physical servers by the host OS 430 on each of the physical servers 200. The host OS 430 measures the load on the physical server 200 by which the host OS 430 is executed, and stores the measurement result in physical resource load monitoring table 740.

The physical resource load monitoring table 740 represents a server ID 741 representing the physical server, a time point 742 at which the physical resource QoS of the VM was measured, a maximum throughput 743 of the physical server, an average throughput threshold 744 which is the average throughput threshold of the physical server, an input/output performance total 745 which is the total input/output performance (IOPS) of the physical resource measured at the time point, an input/output performance threshold 746 which is the threshold of the input/output performance (IOPS) of the physical resource, a transfer performance total 747 which is the total transfer performance (MB/s) of the physical resource measured at the time point, a transfer performance threshold 748 which is the threshold of the transfer performance (MB/s) of the physical resource, and a threshold exceedance 749 which is the result determined at the time point.

The average throughput threshold 744 is the value obtained by multiplying maximum throughput by a predetermined percentage (for example 80%). The input/output performance threshold 746 is the value obtained by multiplying maximum input/output performance by a predetermined percentage (for example 80%). The transfer performance threshold 748 is the value obtained by multiplying maximum transfer performance by a predetermined percentage (for example 80%). The threshold exceedance 749 represents Y in the case that the input/output performance total 745 exceeds the input/output performance threshold 746, or the transfer performance total 747 exceeds the transfer performance threshold 748, and N at other times.

FIG. 11 displays the configuration of the VM load management table 750.

The VM load management table 750 is stored in the physical server by the host OS 430 on the physical server 200. The VM load management table 750 displays the SLA and load of the VM operating on the host OS. The host OS 430 creates the VM load management table 750 on the basis of the SLA management table 730 and the VM load monitoring table 620 of the VM 440 being executed by the host OS 430.

The VM load management table 750 stores a server ID 751 which represents the physical server, a virtual machine ID 752 which represents the VM, a server QoS rank 753 configured to the VM, a storage QoS rank 754 configured to the VM, a time point 755 when the VM QoS was measured, input/output performance (IOPS) 756 of the VM, measured at the time point, and transfer performance (MB/s) 757 of the VM measured at the time point.

FIG. 12 depicts the configuration of the per-rank server resource list 570.

The per-rank server resource list 570 is stored in the management computer 100. The management computer 100 stores the physical server 200 belonging to each server QoS rank in the per-rank server resource list 570.

The per-rank server resource list 570 stores a server ID 572, which represents the physical server 200 belonging to the server QoS rank for each server QoS rank 571, and a host OS number (#) 573 which represents the host OS 430 on the physical server.

FIG. 13 depicts the configuration of the server resource management table 760.

The server resource management table 760 is stored in the physical server by the host OS 430 in each physical server 200. The host OS 430 stores the server QoS rank and load of the physical server 200 by which the host OS 430 is executed, in the server resource management table 760.

The server resource management table 760 contains an entry for each physical server 200. The entry corresponding to a single physical server 200 stores a server ID 761 which represents the physical server, a server QoS rank 762 configured for the physical server, acceptable number of VMs (AVMs) 763 configured for the physical server, number of operating VMs (BVMs) 764 measured in regard to the physical server, and an evaluation value (Ed) 765 for the physical server. The evaluation value Ed represents the VM operating ratio of the physical server, and is obtained by dividing BVM by AVM. The evaluation value Ed may also be the number of operating VMs.

FIG. 14 depicts the configuration of the storage resource management table 770.

The storage resource management table 770 is stored in the physical server by the host OS 430 in each physical server 200. The host OS 430 stores the storage QoS rank and load of the physical storage 300 coupled to the physical server 200 by which the host OS 430 is executed, in the storage resource management table 770.

The storage resource management table 770 contains an entry for each LU within the physical storage 300. The entry corresponding to a single LU stores an apparatus ID 771 representing the physical storage 300 to which the LU is assigned, an LU number (#) 772 representing the LU, a storage QoS rank 773 configured for the physical storage, maximum transfer performance (αMBPS) 774 of the LU, average transfer performance (βMBPS) 775 measured in regard to the LU, an evaluation value (Ee) 776 for the LU, maximum input/output performance (αIOPS) 777 of the LU, average input/output performance (βIOPS) 778 measured in regard to the LU, an evaluation value (Ef) 779 for the LU, storage capacity (αCap) 77a of the LU, and free storage capacity (βCap) 77b which is the size of the free area of the LU. The evaluation value Ee represents the transfer performance utilization for the LU, and is obtained by dividing the βMBPS by the αMBPS. The evaluation value Ef represents the input/output performance utilization for the LU, and is obtained by dividing the βIOPS by the αIOPS.

FIG. 15 depicts the configuration of the server resource candidate list 530.

The server resource candidate list 530 is transmitted from the host OS 430 on the physical server 200, and stored in the management computer 100. The host OS 430 stores the physical server 200 selected as the destination candidate server resource, along with the load thereon, on the server resource candidate list 530.

The server resource candidate list 530 contains an entry for each physical server 200. The entry corresponding to a single physical server 200 stores a server ID 531 representing the physical server, a server QoS rank 532 configured for the physical server, and an evaluation value (Ed) 533 for the physical server.

FIG. 16 depicts the configuration of the storage resource candidate list 540.

The storage resource candidate list 540 is transmitted from the host OS 430 on the physical servers 200, and stored in the management computer 100. The host OS 430 stores the physical storage 300 selected as the destination candidate storage resource, and the load thereon, in the storage resource candidate list 540.

The storage resource candidate list 540 contains an entry for each LU. The entry corresponding to a single LU stores an apparatus ID 541 representing the physical storage 300 to which the LU is assigned, an LU number (#) 542 representing the LU, a storage QoS rank 543 configured for the physical storage, an evaluation value (Ee) 544 for the LU, an evaluation value (Ef) 545 for the LU, and free storage capacity (βCap) 546 for the LU.

FIG. 17 depicts the configuration of the destination server resource candidate list 550.

The destination server resource candidate list 550 is stored in the management computer 100. The management computer 100 creates the destination server resource candidate list 550, on the basis of the server resource candidate lists 530 from a plurality of host OSs 430.

The destination server resource candidate list 550 contains an entry for each physical server 200. The entry corresponding to a single physical server 200 stores a host OS number (#) 551 representing the host OS 430 on the physical server, a server ID 552 representing the physical server, a server QoS rank 553 configured for the physical server, and an evaluation value (Ed) 534 for the physical server.

FIG. 18 depicts the configuration of the destination storage resource candidate list 560.

The destination storage resource candidate list 560 is stored in the management computer 100. The management computer 100 creates the destination storage resource candidate list 560, on the basis of the storage resource candidate lists 540 from a plurality of host OSs 430.

The destination storage resource candidate list 560 contains an entry for each LU. The entry corresponding to a single LU stores a host OS number (#) 561 representing the host OS 430 using the LU, an apparatus ID 562 representing the physical storage 300 to which the LU is assigned, a LU number (#) 563 representing the LU, a storage QoS rank 564 configured for the physical storage, an evaluation value (Ee) 565 for the LU, an evaluation value (Ef) 566 for the LU, and free storage capacity (βCap) 567 of the LU.

The following is a description of the operation of the computer system.

There follows a description of a VM migration process which is the overall computer system process taking place during VM migration.

Figure 19:
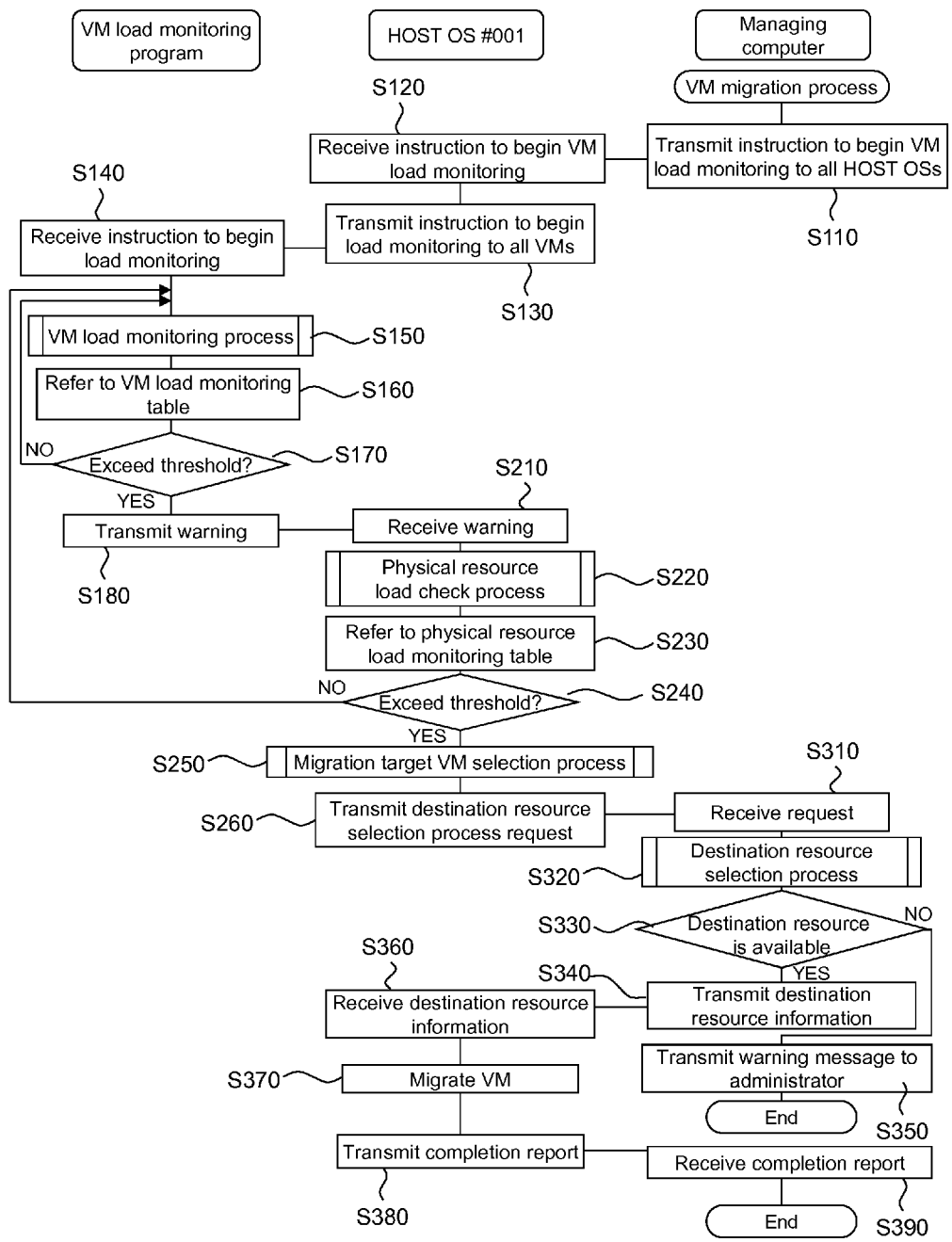
FIG. 19 depicts a VM migration process.

FIG. 19 depicts the VM migration process.

The VM migration process is executed repeatedly. The VM migration process may also be executed periodically.

In S110, the management computer 100 transmits an instruction to begin VM load monitoring, which instructs the beginning of VM load monitoring, to all the host OSs 430 under the management of the management computer 100. In S120, each host OS 430 on the physical server 200 receives the instruction to begin VM load monitoring; in S130, each host OS 430 transmits an instruction to begin load monitoring, which instructs the beginning of load monitoring, to all the VMs 440 on the host OS 430.

In S140, the VM load monitor processing program 630 of the VM 440 receives the instruction to begin load monitoring; in S150, the VM load monitor processing program 630 executes the VM load monitoring process, and saves the results to the VM load monitoring table 620. The VM load monitoring process is described below. In S160, the VM load monitor processing program 630 refers to the VM load monitoring table 620; in S170, the VM load monitor processing program 630 determines whether or not the QoS has exceeded the threshold.

If the program determines in S170 that the QoS has not exceeded the threshold (NO), then VM load monitor processing program 630 returns the process to S150. If the program determines in S170 that the QoS has exceeded the threshold (YES), then in S180, VM load monitor processing program 630 transmits a warning to the host OS 430.

In S210, the host OS 430 receives the warning; in S220, the host OS 430 executes a physical resource load check process, and saves the results to the physical resource load monitoring table 740. The physical resource load check process is described below. In S230, the host OS 430 refers to the physical resource load monitoring table 740; in S240, the host OS 430 determines whether or not the physical resource QoS has exceeded the threshold.

If the host OS 430 determines in S240 that the physical resource QoS has not exceeded the threshold (NO), then the host OS 430 returns the process to S150. If the host OS 430 determines in S240 that the physical resource QoS has exceeded the threshold (YES), then in S250, the host OS 430 executes the migration target VM selection process to select a target VM for migration, and in S260, transmits a destination resource selection process request to the management computer 100. The migration target VM selection process is described below. The destination resource selection process request includes the server QoS rank and the storage QoS rank of the target VM for migration.

In S310, the management computer 100 receives the destination resource selection process request; in S320, the management computer 100 executes destination resource selection process, and in S330, determines whether or not a destination resource is available. The destination resource selection process is described below.

If, in S330, it is determined that no destination resource exists (NO), then in S340, the management computer 100 transmits a warning message, to the administrator's terminal, representing that no destination resource is available, and ends the flow. If, in S330, it is determined that a destination resource is available (YES), then in S350, the management computer 100 transmits destination resource information representing the destination resource, to the host OS 430, which transmitted the destination resource selection process request.

In S360, the host OS 430 receives the destination resource information; in S370, the host OS 430 migrates the target VM for migration to the destination resource; in S380, once VM migration is completed, the host OS 430 transmits a completion report to the management computer 100. In S390, the management computer 100 receives the completion report, and ends the flow.

This completes the description of the VM migration process. By using this process, it is possible to select a target VM for migration and a destination resource and migrate the target VM for migration to the destination resource in cases where the load on the VM exceeds the threshold.

The following is a description of the load on the VM monitoring process in the aforementioned S150, executed by the VM load monitor processing program 630 in the VM 440.

Figure 20:
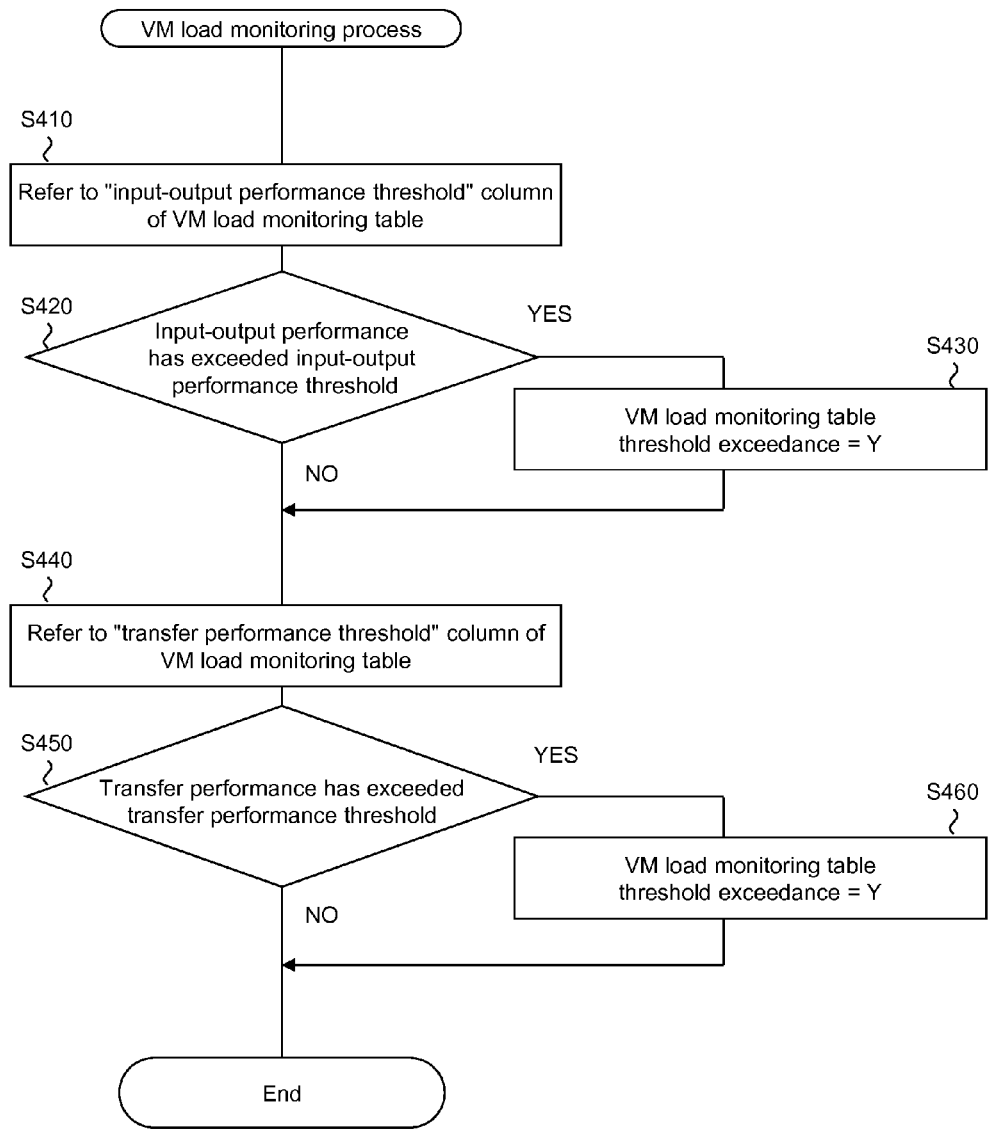
FIG. 20 depicts a VM load monitoring process.

FIG. 20 depicts the VM load monitoring process.

In S410, the VM load monitor processing program 630 refers to the input/output performance threshold 625 of the VM load monitoring table 620; in S420, the VM load monitor processing program 630 measures the VM input/output performance total 624 and determines whether the input/output performance total 624 has exceeded the input/output performance threshold 625. Here, the input/output performance threshold 625 is the evaluation value Ea threshold defined within the QoS rank management table 610; in this embodiment, the input/output performance threshold 625 is the evaluation value Ea threshold Ta3, where the server QoS rank is 3.

In S420, if it is determined that the input/output performance total 624 has not exceeded the input/output performance threshold 625 (NO), the VM load monitor processing program 630 moves the process on to S440. In S420, if it is determined that the input/output performance total 624 has exceeded the input/output performance threshold 625 (YES), then in S430, the VM load monitor processing program 630 configures the value of the threshold exceedance 628 in the VM load monitoring table 620 as "Y".

In S440, the VM load monitor processing program 630 refers to the transfer performance threshold 627 in the VM load monitoring table 620; in S450, the VM load monitor processing program 630 measures the transfer performance total 626 of the VM, and determines whether or not the transfer performance total 626 has exceeded the transfer performance threshold 627. Here, the transfer performance threshold 627 is the evaluation value Eb threshold and evaluation value Ec threshold defined in the QoS rank management table 610; in this embodiment, the transfer performance threshold 627 is the evaluation value Eb threshold Tb2 and evaluation value Ec threshold Tc2, where the storage QoS rank is 2. In S450, the VM load monitor processing program 630 may also determine performance by comparing the free storage capacity threshold defined in the QoS rank management table 610 with the LU free storage capacity.

If, in S450, it is determined that the transfer performance total 626 has not exceeded the transfer performance threshold 627 (NO), then the VM load monitor processing program 630 ends the flow. If, in S450, it is determined that the transfer performance total 626 has exceeded the transfer performance threshold 627 (YES), then in S460, the VM load monitor processing program 630 configures the value of the threshold exceedance 628 in the VM load monitoring table 620 to "Y", and ends the flow. The VM load monitor processing program 630 may also use either input/output performance or transfer performance to determine a load on the VM 440, or use the evaluation value calculated from input/output performance or transfer performance to determine a load on the VM 440.

This completes the description of the VM load monitoring process. By using this process, the VM 440 can measure its own load, and determine whether or not the load has exceeded a prescribed load threshold. A load on the VM 440 may be determined by using either the input/output performance of the physical storage 300 by the VM 440 or the transfer performance of the physical storage 300 by the VM 440.

The following is a description of the physical resource load check process executed by the physical resource load check program 810 in the host OS 430 during the aforementioned S220.

Figure 21:
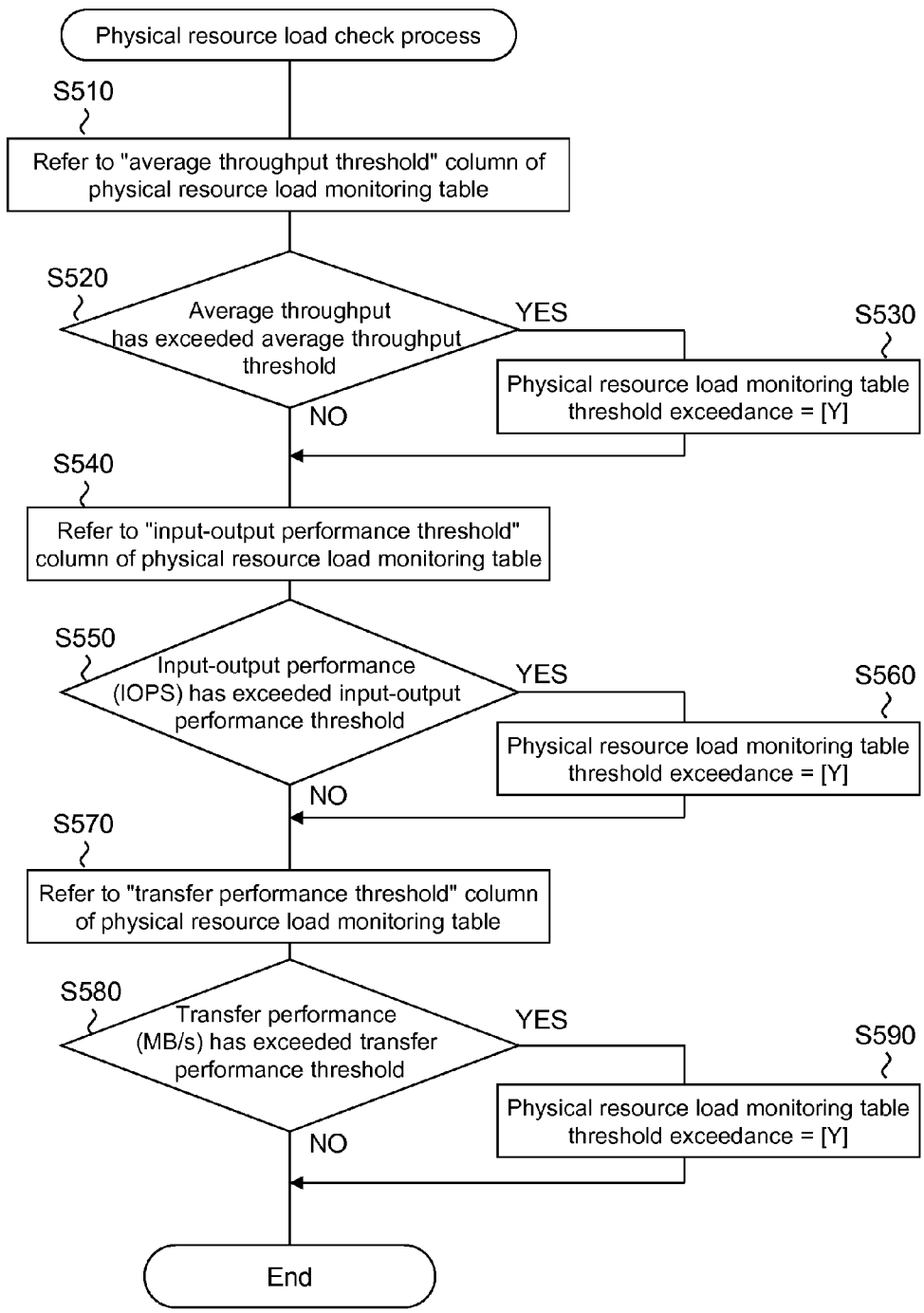
FIG. 21 depicts a physical resource load check process.

FIG. 21 depicts the physical resource load check process.

In S510, the physical resource load check program 810 refers to the average throughput threshold 744 in the physical resource load monitoring table 740; in S520, the physical resource load check program 810 determines whether the measured average throughput has exceeded the average throughput threshold 744.

If, in S520, it is determined that the average throughput has not exceeded the average throughput threshold 744 (NO) then the physical resource load check program 810 moves the process on to S540. If, in S520, it is determined that the average throughput has exceeded the average throughput threshold 744 (YES), then in S530, the physical resource load check program 810 configures the value of the threshold exceedance 749 in the physical resource load monitoring table 740 to "Y".

In S540, the physical resource load check program 810 refers to the input/output performance threshold 746 in the physical resource load monitoring table 740; in S550, the physical resource load check program 810 determines whether or not the measured input/output performance has exceeded the input/output performance threshold 746.

If, in S550, it is determined that the input/output performance has not exceeded the input/output performance threshold 746 (NO), then the physical resource load check program 810 moves the process on to S570. If, in S550, it is determined that the input/output performance has exceeded the input/output performance threshold 746 (YES), then in S560, the physical resource load check program 810 configures the value of the threshold exceedance 749 in the physical resource load monitoring table 740 to "Y".

In S570, the physical resource load check program 810 refers to the input/output performance threshold 746 in the physical resource load monitoring table 740; in S580, the physical resource load check program 810 determines whether or not the measured transfer performance has exceeded the transfer performance threshold 748.

If, in S580, the transfer performance is determined not to have exceeded the transfer performance threshold 748 (NO), then the physical resource load check program 810 ends this flow. If, in S580, the transfer performance is determined to have exceeded the transfer performance threshold 748 (YES), then in S590, the physical resource load check program 810 configures the value of the threshold exceedance 749 in the physical resource load monitoring table 740 to "Y".

This completes the description of the physical resource load check process. By using this process, the host OS 430 can confirm the load on the physical server 200 on which the host OS 430 is operating and the load on the physical storage 300 that the host OS 430 is using, in the case that the load on the VM 440 operating on the host OS 430 exceeds the threshold, and if the load is confirmed as high, the host OS 430 can begin to migrate the VM. As a result, even if the load on a specific VM 440 spikes temporarily, the VM migration will not be executed providing that the overall load on the host OS 430 operating the VM does not exceed the threshold. This allows the system to prevent an increase in load due to frequent migration.

The following is a description of the migration target VM selection process executed by the migration target VM selection processing program 820 within the host OS 430, in aforementioned S250.

Figure 22:
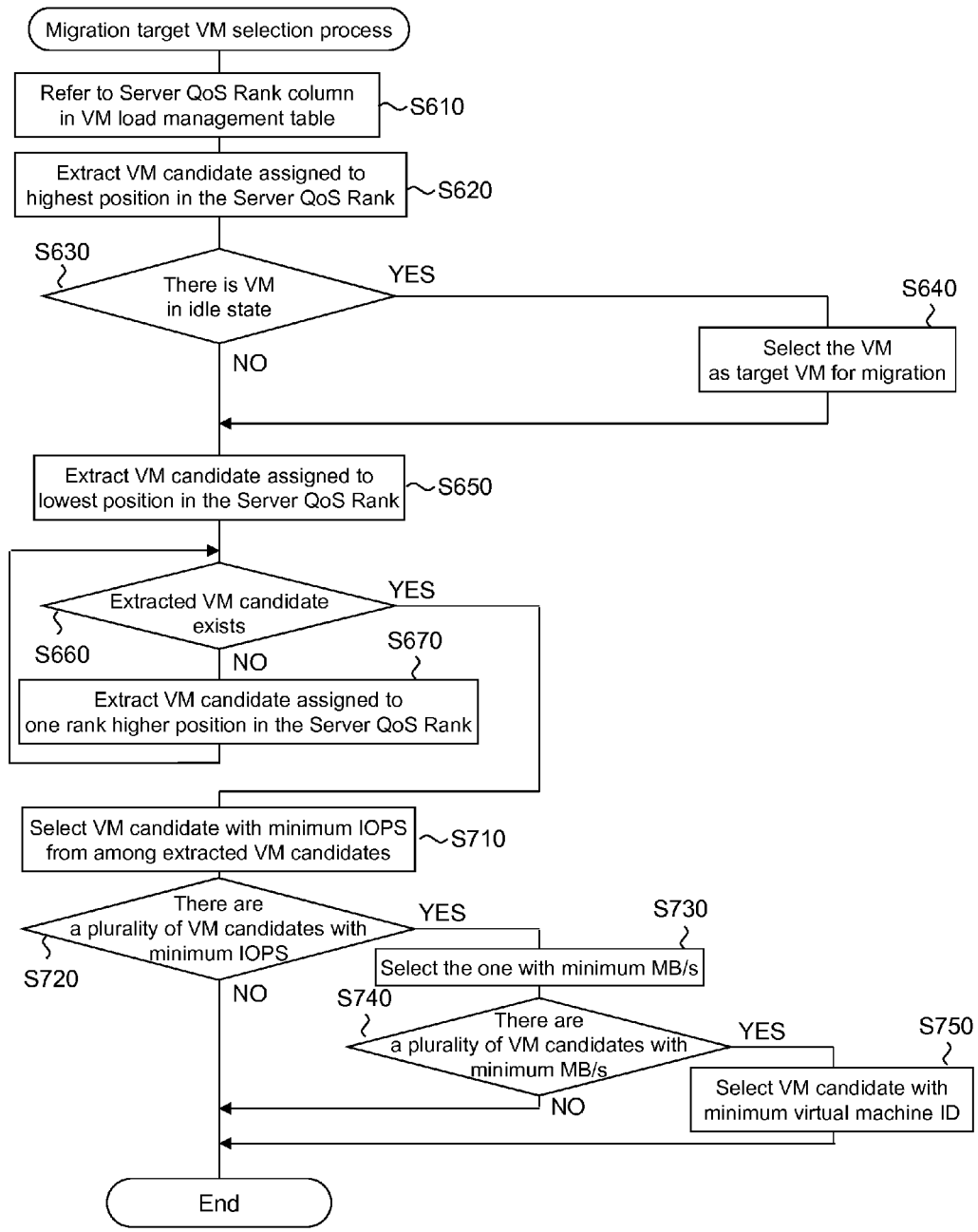
FIG. 22 depicts a migration target VM selection process.

FIG. 22 depicts the migration target VM selection process.

When the load on a certain VM rises, the higher the service level of the migrated VM, the greater the volume of resources released. For this reason, the search prioritizes a VM with a higher than specified service level, which is in an idle state. If no VM meets these conditions, a VM not in an idle state will be migrated. It is, however, difficult to migrate a VM that is accessed frequently. In addition, migrating a VM with a high service level because the VM has a low load is likely to result in the migration of other VMs when the load on the original VM increases. For this reason, a VM with both service level and load lower than those specified should be migrated from among VMs operating on a certain physical server, thereby reducing the load on the physical server, increasing usable resources on the physical server with a high load and maintaining the VM service level.

In S610, the migration target VM selection processing program 820 refers to the server QoS rank 753 in the VM load management table 750; in S620, the migration target VM selection processing program 820 extracts the VM belonging to the highest position in the server QoS rank from the VM load management table 750 as the VM candidate. In the present embodiment, the highest server QoS rank is 3. Here, the migration target VM selection processing program 820 may extract the VM belonging to the highest server QoS rank from among the plurality of VMs operating on the host OS 430 as the VM candidate. In S630, the migration target VM selection processing program 820 determines whether there is a VM in an idle state among the VM candidates. Here, the migration target VM selection processing program 820 may, for example, determine from the VM load management table 750 that a VM having input/output performance (IOPS) of 0 and transfer performance (MB/s) of 0 is in an idle state. Furthermore, the migration target VM selection processing program 820 may acquire VM status, etc., provided by virtualization software to determine it.

If, in S630, it is determined that there are no VMs in an idle state among the VM candidates (NO), then the migration target VM selection processing program 820 moves the process on to S650. If, in S630, it is determined that there is a VM in an idle state among the VM candidates (YES), then the migration target VM selection processing program 820 selects the VM as the target VM for migration.

In S650, the migration target VM selection processing program 820 extracts the VM belonging to the lowest server QoS rank from the VM load management table 750 as the VM candidate. In the present embodiment, the lowest server QoS rank is 1. Here, the migration target VM selection processing program 820 may extract the VM belonging to the lowest server QoS rank from among the plurality of VMs operating on the host OS 430 as the VM candidate. In S660, the migration target VM selection processing program 820 determines whether or not a VM candidate has been extracted.

If, in S660, it is determined that a VM candidate has been extracted (YES), then the migration target VM selection processing program 820 moves the process on to S710. If, in S660, it is determined that no VM candidate has been extracted (NO), then in S670, the migration target VM selection processing program 820 extracts, from the VM load management table 750, a VM candidate belonging to a server QoS one rank higher.

In S710, the migration target VM selection processing program 820 selects the VM candidate having the minimum input/output performance (IOPS) from among the extracted VM candidates; in S720, the migration target VM selection processing program 820 determines whether or not there are a plurality of VM candidates having the minimum input/output performance.

If, in S720, it is determined that there is only one VM candidate having the minimum input/output performance (NO), then the migration target VM selection processing program 820 defines the VM candidate as the target VM for migration, and ends this flow. If, in S720, it is determined that there are a plurality of VM candidates having the minimum input/output performance (YES), then, in S730, the migration target VM selection processing program 820 selects, from among the VM candidates, a VM having the minimum transfer performance (MB/s) as the VM candidate. In S740, the migration target VM selection processing program 820 determines whether or not there are a plurality of VM candidates having the minimum transfer performance.

If, in S740, it is determined that there is only one VM candidate having the minimum transfer performance (NO), then the migration target VM selection processing program 820 defines the VM candidate as the target VM for migration, and ends this flow. If, in S740, it is determined that there are a plurality of VM candidates having the minimum transfer performance (YES), then, in S750, the migration target VM selection processing program 820 selects, as the target VM for migration, the one among the VM candidates having the minimum virtual machine ID, on the basis of the VM load management table 750, and ends this flow.

This completes the description of the migration target VM selection process. By using this process, the host OS 430 is able to select a suitable VM from among the plurality of VMs operating on the host OS 430 in order to reduce the load. Furthermore, the host OS 430 uses conditions of being assigned to the highest server QoS rank and being in an idle state as target conditions, and if the host OS 430 finds a VM that meets the target conditions, the host OS 430 selects the VM as the target VM for migration, allowing for movement of a VM that may be unable to maintain QoS to another physical server 200. Furthermore, by migrating a VM in an idle state it is possible to limit the load resulting from VM migration. In addition, if no VM meeting the target conditions is found on the host OS 430, the host OS 430 selects a VM assigned to the lowest server QoS rank and with the lowest load as the target VM for migration, allowing it to retain the QoS of other VMs. Furthermore, by migrating a VM with a low load it is possible to limit the load resulting from VM migration.

The following is a description of the destination resource selection process executed by the destination resource selection processing program 580 within the management computer 100, in the aforementioned S250.

Figure 23:
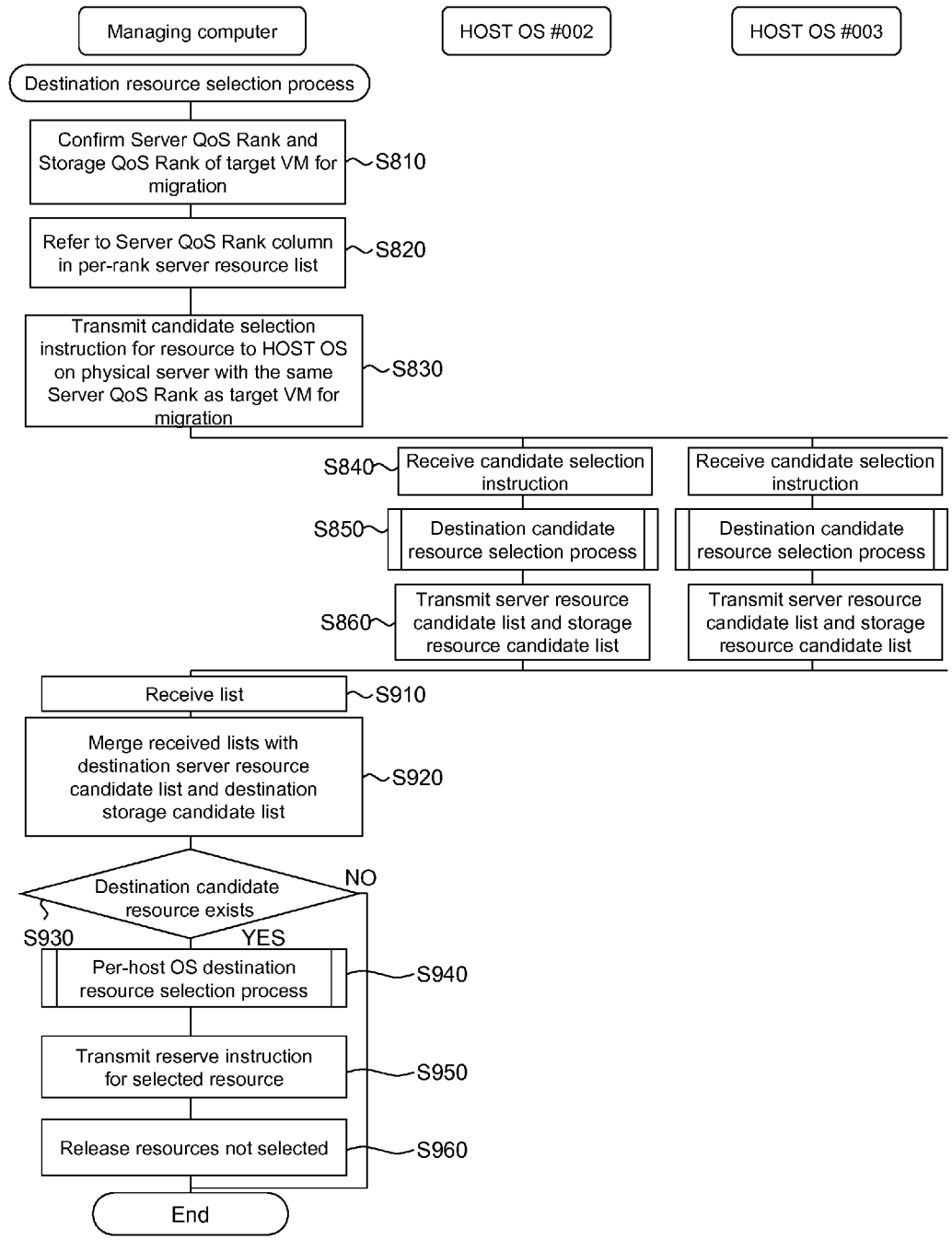
FIG. 23 depicts a destination resource selection process.

FIG. 23 depicts the destination resource selection process.

In S810, the destination resource selection processing program 580 acquires the server QoS rank and storage QoS rank of the target VM for migration, from the destination resource selection process request. In S820, the destination resource selection processing program 580 selects a physical server 200 with server QoS rank configured for the target VM for migration, different from the physical server operating the target VM for migration, on the basis of the server QoS rank 571 in the per-rank server resource list 570 and selects the host OS 430 on the selected physical server 200. In S830, the destination resource selection processing program 580 transmits a candidate selection instruction which instructs selection of the destination candidate resource, to the selected host OS 430.

When the host OS 430 receives the candidate selection instruction in S840, the host OS 430 executes the destination candidate resource selection process in S850, and, in S860, transmits the results of this execution, in the form of a server resource candidate list and a storage resource candidate list, to the management computer 100. The destination candidate resource selection process is described below.

In S910, the destination resource selection processing program 580 in the management computer 100 receives the server resource candidate list and storage resource candidate list; in S920, the destination resource selection processing program 580 merges the received server resource candidate list and storage resource candidate list with the destination server resource candidate list 550 and the destination storage resource candidate list 560. In S930, the destination resource selection processing program 580 determines whether or not destination candidate resources are available within the destination server resource candidate list 550 and destination storage resource candidate list 560. The destination candidate resources include destination candidate server resources and destination candidate storage resources.

If, in S930, it is determined that no destination candidate resource exists (NO), then the destination resource selection processing program 580 ends this flow. If, in S930, it is determined that destination candidate resources exists (YES) then, in S940, the destination resource selection processing program 580 executes a per-host OS destination resource selection process. The per-host OS destination resource selection process is described below. In S950, the destination resource selection processing program 580 transmits a reserve instruction, which reserves the destination resource selected according to the per-host OS destination resource selection process; in S960, it releases resources not selected, and ends this flow.

This completes the description of the destination resource selection process. By using this process, the management computer 100 is able to select a destination candidate server resource on the basis of the server QoS rank configured for the physical server 200 and the target VM for migration. Furthermore, the selection, as the destination candidate server resource, of the physical server 200 having the same server QoS rank as the target VM for migration, allows the QoS of the target VM for migration to be maintained after migration. Furthermore, by transmitting instructions to the host OS 430 of the destination candidate server resource, the management computer 100 is able to acquire information representing destination candidate storage resources. Furthermore, by ranking the physical server 200 according to server QoS rank, it is possible to transmit a selection instruction only to the physical servers 200 having the same server QoS rank as the server QoS rank configured for the target VM for migration. As a result, there is no need to compare the load of all the physical servers 200, making the process of selecting a destination server resource from among many physical servers 200 much simpler. Furthermore, it is also possible to avoid selecting a physical server 200 that cannot maintain the service level of the target VM for migration as the destination server resource.

The following is a description of the destination candidate resource selection process executed by the destination candidate resource selection processing program 830 within the host OS 430 in the aforementioned S850.

Figure 24:
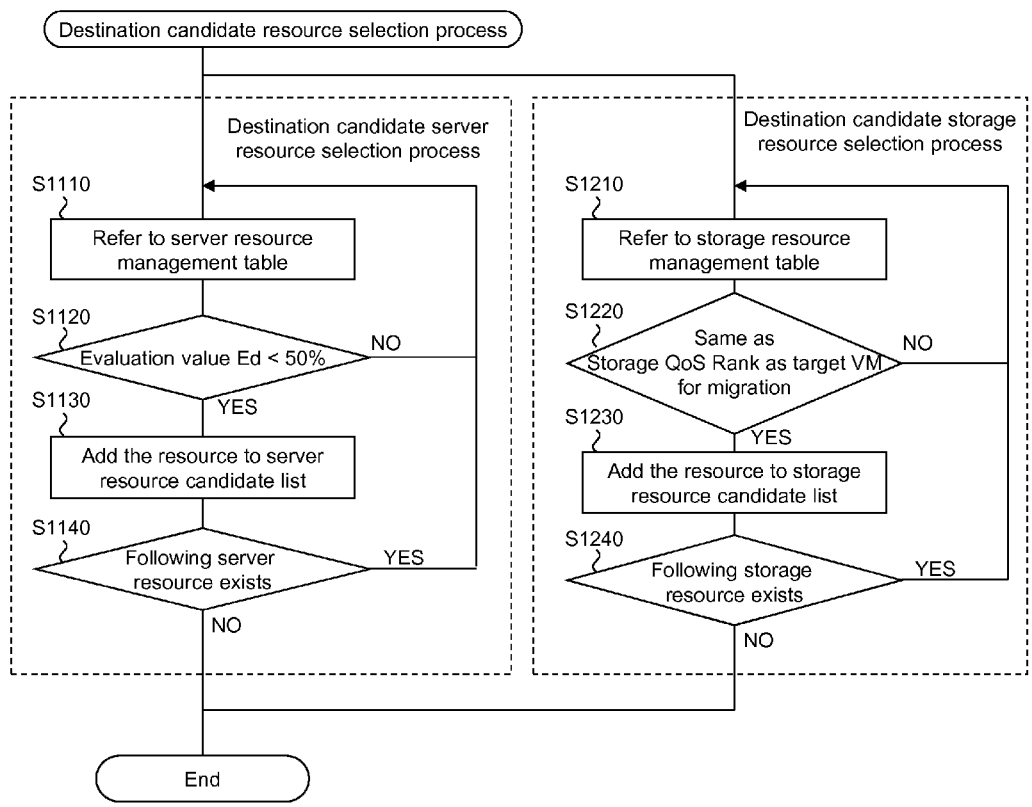
FIG. 24 depicts a destination candidate resource selection process.

FIG. 24 depicts the destination candidate resource selection process.

In the destination candidate resource selection process, the destination candidate resource selection processing program 830 executes the destination candidate server resource selection processes in S1110 through S1140, and the destination candidate storage resource selection processes in S1210 through S1240.

The following is a description of the destination candidate server resource selection process. In S1110, the destination candidate resource selection processing program 830 refers to the server resource management table 760, and selects one physical server 200 therefrom as the server resource. In S1120, the destination candidate resource selection processing program 830 determines whether or not the evaluation value Ed of the selected server resource is lower than the predetermined evaluation value threshold Td. The evaluation value threshold Td may be, for example, 50%.

If, in S1120, it is determined that the evaluation value Ed is not lower than the evaluation value threshold Td (NO), then the destination candidate resource selection processing program 830 moves the process on to S1110. If, in S1120, it is determined that the evaluation value Ed is lower than the evaluation value threshold Td (YES), then, in S1130, the destination candidate resource selection processing program 830 adds the server resource to the server resource candidate list; in S1140, the destination candidate resource selection processing program 830 determines whether or not the following server resource exists in the server resource management table 760.

If, in S1140, it is determined that the following server resource exists (YES), then the destination candidate resource selection processing program 830 returns the process to S1110. If, in S1140, it is determined that the following server resource does not exist (NO), then the destination candidate server resource selection process is ended.

The following is a description of the destination candidate storage resource selection process. In S1210, the destination candidate resource selection processing program 830 refers to the storage resource management table 770, and selects one physical storage 300 therefrom as the storage resource. Here, the physical storage 300 represented in the storage resource management table 770 on one physical server 200 is a physical storage 300 positioned on the same site as the physical server 200 and coupled to the physical server 200.

In S1220, the destination candidate resource selection processing program 830 determines whether or not the storage QoS rank of the selected storage resource is the same as the storage QoS rank of the target VM for migration.

If, in S1220, it is determined that the storage QoS ranks of the storage resource and target VM for migration are mutually different (NO), the destination candidate resource selection processing program 830 returns the process to S1210. If, in S1220, it is determined that the storage QoS ranks of the storage resource and the target VM for migration are the same (YES), then, in S1230, the destination candidate resource selection processing program 830 adds the storage resource to the storage resource candidate list; in S1240, the destination candidate resource selection processing program 830 determines whether or not the following storage resource exists in the storage resource management table 770.

If, in S1240, it is determined that the following storage resource exists (YES), then the destination candidate resource selection processing program 830 returns the process to S1210. If, in S1240, it is determined that the following storage resource does not exist (NO), then the destination candidate resource selection program 830 ends the destination candidate storage resource selection process.

This completes the description of the destination candidate resource selection process. By using this process, the host OS 430 is able to select, as a destination candidate server resource, a physical server 200 with the evaluation value Ed that is lower than the evaluation value threshold Td. Furthermore, the host OS 430 is able to select, as the destination candidate storage resource, an LU of the physical storage 300 having the same storage QoS rank as that of the target VM for migration. Additionally, by ranking the physical storage 300 according to the storage QoS rank, it is possible to narrow the field down only to the physical storage 300 having the same storage QoS rank as the storage QoS rank configured for the target VM for migration, as the destination candidate storage resource. As a result, there is no need to compare the load of all the physical storage 300, making the process of selecting a destination storage resource from among many physical storages 300 much simpler. Furthermore, it is also possible to avoid selecting a physical storage 300 that cannot maintain the service level of the target VM for migration as the destination storage resource. Additionally, selecting the physical storage 300 coupled to the destination candidate server resource as the destination candidate storage resource prevents a reduction in VM performance after migration.

The following is a description of the per-host OS destination resource selection process executed by the per-host OS destination resource selection processing program 590 within the management computer 100 in the aforementioned S940.

Figure 25:
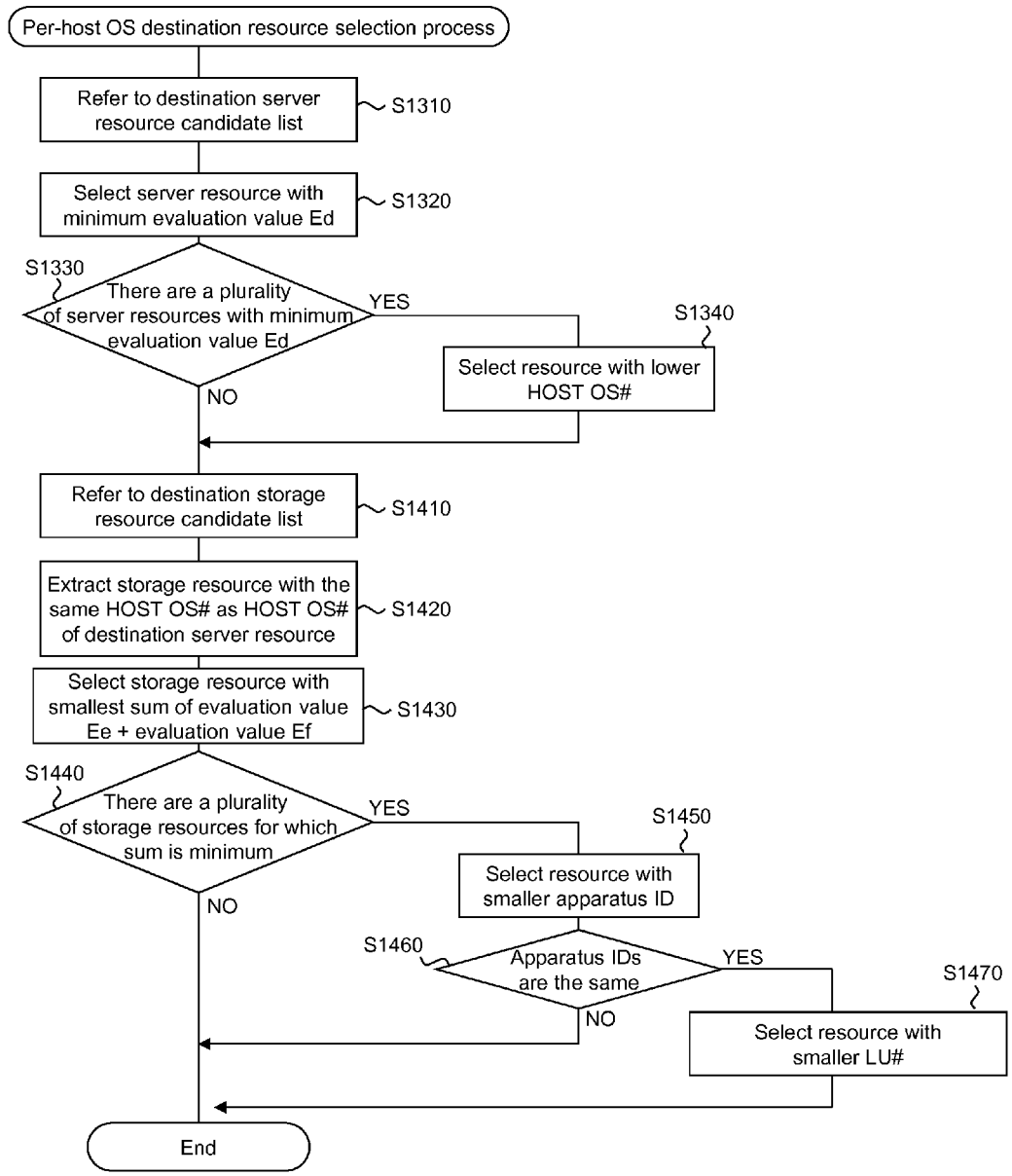
FIG. 25 depicts a per-host OS destination resource selection process.

FIG. 25 depicts the per-host OS destination resource selection process.

In S1310, the per-host OS destination resource selection processing program 590, which is executed by the management computer 100, refers to the destination server resource candidate list 550; in S1320, the per-host OS destination resource selection processing program 590 selects a server resource with the minimum evaluation value Ed. Here, the per-host OS destination resource selection processing program 590 may select a server resource in consideration of the geographical distance between the original physical server 200 and the destination physical server 200 of the target VM for migration, the communications distance indicated by the number of hops, and the like. The per-host OS destination resource selection processing program 590 may, for example, give priority to selecting a server resource near to the original physical server 200, or near to the user of the target VM for migration, as the destination server resource. In S1330, the per-host OS destination resource selection processing program 590 determines whether or not there are a plurality of server resources with the minimum evaluation value Ed.

If, in S1330, it is determined that there is only one server resource with the minimum evaluation value Ed (NO), then the per-host OS destination resource selection processing program 590 defines the selected server resource as the destination server resource, and moves the process to S1410. If, in S1330, it is determined that there are a plurality of server resources with the minimum evaluation value Ed (YES), then, in S1340, the per-host OS destination resource selection processing program 590 selects the server resource with the lowest host OS number as the destination server resource.

In S1410, the per-host OS destination resource selection processing 10 program 590 refers to the destination storage resource candidate list 560; in S1420, the per-host OS destination resource selection processing program 590 extracts the storage resource having the same host OS number as the host OS number of the destination server resource. In S1430, the per-host OS destination resource selection processing program 590 selects, from among the 15 extracted storage resources, the storage resource with the smallest sum when the evaluation value Ee and the evaluation value Ef are added together; in S1440, the per-host OS destination resource selection processing program 590 determines whether or not there are a plurality of storage resources for which this sum gives the smallest total.

If, in S1440, it is determined that only one storage resource has the smallest sum (NO), then the per-host OS destination resource selection processing program 590 defines the selected storage resource as the destination storage resource, and ends this flow. If, in S1440, it is determined that a plurality of storage resources have the smallest sum (YES), then, in S1450, the per-host OS destination resource selection processing program 590 selects, from among the plurality of storage resources with the smallest sum, the storage resource with the smallest apparatus ID 771, and determines whether or not a plurality of storage resources with the same apparatus ID have been selected.

If, in S1460, it is determined that a plurality of storage resources with the same apparatus ID have not been selected (NO), then the per-host OS destination resource selection processing program 590 defines the selected storage resource as the destination storage resource, and ends this flow. If, in S1460, it is determined that a plurality of storage resources with the same apparatus ID have been selected (YES), then, in S1470, the per-host OS destination resource selection processing program 590 selects, from among the selected plurality of storage resources, the storage resource with the smallest LU number as the destination storage resource, and ends this flow.

This completes the description of the per-host OS destination resource selection process. In this way, by selecting a physical server 200 having the minimum load from among the physical servers 200 in the destination candidates as the destination server resource, it is possible to limit the load on the destination server resource after migration, and maintain the QoS of the target VM for migration after migration. Furthermore, by using the evaluation value Ed of the physical server 200, it is possible to select a physical server 200 with a low load as the destination server resource. Additionally, by selecting physical storage 300 having the minimum load from among the physical storages 300 in the destination candidates as the destination storage resource, it is possible to limit the load on the destination storage resource after migration, and maintain the QoS of the target VM for migration after migration. Furthermore, by using the input/output performance and transfer performance of the physical storage 300, it is possible to select the physical storage 300 with a low load as the destination storage resource. By managing information of the physical storage 300 for each LU, it is possible to select an LU being used by the destination server resource as the destination storage resource.

In the above description, information of the present invention is described by using expressions such as "aaa table", "aaa list", "aaa DB", and "aaa cue", but the information may be expressed by using means of expression other than the data structures, that is, tables, lists, DBs, cues, etc. For this reason, in order to ensure that the information is not dependent on data structure, "aaa table", "aaa list", "aaa DB", "aaa cue", etc. may be referred to as "aaa information".

Furthermore, as each piece of information is described, expressions such as "identifying information", "identifiers", "titles", "names", and "ID" are used; these are mutually replaceable.

Furthermore, although this description takes the "program" as the subject, the program is executed by a processor, thereby predetermined processes are executed by using memory and communications ports, and may therefore also be described taking the "processor" as the subject. Additionally, the processes disclosed with the program as the subject may also be executed by the management computer or information processing apparatus. Furthermore, some or the entire program may be realized by dedicated hardware.

Additionally, the various programs may be installed onto each computer via a program distribution server or storage media that is readable by a computer.

The following is a description of the terminology used in an aspect of the present invention. A "management computer" corresponds to the management computer 100, etc. A "server apparatus" corresponds to the physical server 200, etc. A "storage apparatus" corresponds to the physical storage 300, etc. A "primary communications network" corresponds to the communications network 420, etc. A "secondary communications network" corresponds to the communications network 410, etc. A "virtual machine" corresponds to the VM 440, etc. A "server rank" corresponds to the server QoS rank, etc. configured for the physical server 200. A "storage rank" corresponds to the storage QoS rank, etc. configured for the physical storage 300. A "required server rank" corresponds to the server QoS rank, etc. configured in the SLA. A "required storage rank" corresponds to the storage QoS rank, etc. configured in the SLA. A "destination server apparatus" corresponds to the destination server resource, etc. A "destination storage apparatus" corresponds to the destination storage resource, etc. A "target virtual machine" corresponds to the target VM for migration, etc. A "target virtual machine information" corresponds to the destination resource selection process request, etc. A "destination information" corresponds to the destination resource information, etc. A "load on the virtual machine" corresponds to input/output performance, transfer performance, etc. A "load on destination candidate server apparatus" corresponds to the evaluation value Ed, etc. A "load on destination candidate storage apparatus" corresponds to the sum of the evaluation value Ee and the evaluation value Ef, etc.

The present invention is not restricted by the aforementioned embodiment, and may be changed into various other formats providing it does not deviate from scope of its original intent.

REFERENCE SIGNS LIST

100: management computer 110: CPU 120: Memory 130: Internal storage device 140: NIC (Network Interface Card) 200: Physical server 210: CPU 220: Memory 230: Internal storage device 240: NIC (Network Interface Card) 250: System LSI 260: FC-HBA 270: PCIe-HBA 300: Physical storage 310: Microprocessor 320: Memory 330: Port 340: disk drive 350: HDD 360: NIC 410: Communications network 420: Communications network 430: Host OS (Operating System) 440: VM (Virtual Machine) 450: Microprogram 460: LU (Logical Unit)

The invention claimed is:

1. A computer system, comprising:
a plurality of server apparatuses;
a plurality of storage apparatuses coupled, via a primary communications network, to the plurality of server apparatuses; and
a management computer coupled, via a secondary communications network, to the plurality of server apparatuses and the plurality of storage apparatuses, wherein,
the management computer is configured to store a server rank which is configured for each of the plurality of server apparatuses and represents a rank of a throughput of a server apparatus, and a storage rank which is configured for each of the plurality of storage apparatuses and represents a rank of a throughput of a storage apparatus,
each of the plurality of server apparatuses is configured to execute a plurality of virtual machines, store a required server rank, which is a server rank of a server apparatus allocated to each of the plurality of virtual machines, and a required storage rank, which is a storage rank of a storage apparatus allocated to each of the plurality of virtual machines, determine whether or not to migrate a virtual machine on the basis of a load on the plurality of virtual machines, select a target virtual machine from among the plurality of virtual machines on the basis of the load on the plurality of virtual machines where the migration is determined, and transmit target virtual machine information which represents a required server rank and a required storage rank for the target virtual machine to the management computer,
in response to the target virtual machine information, the management computer is configured to select a server apparatus having a server rank equal to the required server rank of the target virtual machine, as a destination server apparatus, from among the plurality of server apparatuses, select a storage apparatus having a storage rank equal to the required storage rank of the target virtual machine, as a destination storage apparatus, from among the plurality of storage apparatuses, and transmit destination information which represents the destination server apparatus and destination storage apparatus, to a target server apparatus that executes the target virtual machine, and
the target server apparatus is configured to migrate the target virtual machine to the destination server apparatus and the destination storage apparatus on the basis of the destination information, the target server apparatus is configured to determine whether or not a virtual machine that fulfills target conditions exists by using the target conditions of having a highest required server rank among the plurality of virtual machines and being in an idle state, and is configured to select a virtual machine that fulfills the target conditions as the target virtual machine when it is determined that the virtual machine that fulfills the target conditions exists, and when it is determined that no virtual machine exists that fulfills the target conditions, the target server apparatus is configured to select, as the target virtual machine, a virtual machine having a lowest required server rank from among the plurality of virtual machines.

2. The computer system according to claim 1, wherein when a plurality of virtual machines exist having the lowest required server rank, the target server apparatus is configured to select, as the target virtual machine, a virtual machine having a minimum load from among the plurality of virtual machines having the lowest required server rank.

3. The computer system according to claim 2, wherein in response to the target virtual machine information, the management computer is configured to select a destination candidate server apparatus which is a server apparatus, from among the plurality of server apparatuses, other than the target server apparatus and having a server rank equal to the required server rank of the target virtual machine, and transmit requirement information which represents the required storage rank of the target virtual machine, to the destination candidate server apparatus, the destination candidate server apparatus is configured to select a storage apparatus, which is coupled to the destination candidate server apparatus, and having a storage rank equal to the required storage rank of the target virtual machine, as the destination candidate storage apparatus, and transmit destination candidate information which represents the state of the destination candidate server apparatus and the state of the destination candidate storage apparatus, to the management computer, and on the basis of the destination candidate information, the management computer is configured to select the destination server apparatus from among the destination candidate server apparatuses, and the destination storage apparatus from among the destination candidate storage apparatuses.

4. The computer system according to claim 3, wherein the destination candidate information represents a load on the destination candidate server apparatus, and when there are a plurality of destination candidate server apparatuses, the management computer is configured to select, as the destination server apparatus, a destination candidate server apparatus having a minimum load from among the plurality of destination candidate server apparatuses.

5. The computer system according to claim 4, wherein the destination candidate information represents a load on the destination candidate storage apparatus, and when there are a plurality of destination candidate storage apparatuses, the management computer is configured to select, as the destination storage apparatus, a storage apparatus having a minimum load from among the plurality of destination candidate storage apparatuses.

6. The computer system according to claim 5, wherein a load on the virtual machine includes either a storage apparatus input-output frequency of the virtual machine, or a storage apparatus transfer speed of the virtual machine.

7. The computer system according to claim 6, wherein the load on the destination candidate server apparatus is expressed as a value obtained by dividing the number of virtual machines operating on the specified server apparatus, by the allowable number of virtual machines operating on the specified server apparatus.

8. The computer system according to claim 7, wherein the load on the destination candidate storage apparatus includes either an input-output frequency of the destination candidate storage apparatus, or a transfer speed of the destination candidate storage apparatus.

9. The computer system according to claim 3, wherein each of the plurality of storage apparatuses is configured to provide a logical volume, and the management computer is configured to store a storage rank configured for the logical volume, and select a logical volume having a storage rank equal to the required storage rank of the target virtual machine as the destination storage apparatus.

10. The computer system according to claim 3, wherein the target server apparatus is configured to determine whether or not any of loads on the plurality of virtual machines exceed a predetermined load threshold, determine whether or not a confirmation condition has been fulfilled by using the confirmation condition of a load on the target server apparatus exceeding a predetermined server load threshold, or a load on a storage apparatus being used by the target server apparatus exceeding a predetermined storage load threshold when it is determined that any of the loads on the plurality of virtual machines exceed the load threshold, and determine to execute the migration when it is determined that the confirmation condition is fulfilled.

11. A control method for a computer system, comprising a plurality of server apparatuses, a plurality of storage apparatuses coupled, via a primary communications network, to the plurality of server apparatuses, and a management computer coupled, via a secondary communications network, to the plurality of server apparatuses and the plurality of storage apparatuses, comprising:

storing, by the management computer, a server rank which is configured for each of the plurality of server apparatuses and represents a rank of a throughput of a server apparatus, and a storage rank which is configured for each of the plurality of storage apparatuses and represents a rank of a throughput of a storage apparatus;

by each of the plurality of server apparatuses, executing a plurality of virtual machines, storing a required server rank which is a server rank of a server apparatus allocated to each of the plurality of virtual machines, and a required storage rank which is a storage rank of a storage apparatus allocated to each of the plurality of virtual machines, determining whether or not to migrate a virtual machine on the basis of the load on the plurality of virtual machines, selecting a target virtual machine from among the plurality of virtual machines on the basis of the load on the plurality of virtual machines when the migration is determined, and transmitting, to the management computer, target virtual machine information which represents a required server rank and a required storage rank for the target virtual machine;

by the management computer, in response to the target virtual machine information, selecting a server apparatus having a server rank equal to the required server rank of the target virtual machine, as a destination server apparatus, from among the plurality of server apparatuses, selecting a storage apparatus having a storage rank equal to the required storage rank of the target virtual machine, as a destination storage apparatus, from among the plurality of storage apparatuses, and transmitting destination information which represents the destination server apparatus and destination storage apparatus, to the target server apparatus that executes the target virtual machine;

migrating, by the target server apparatus, the target virtual machine to the destination server apparatus and the destination storage apparatus on the basis of the destination information, determining, by the target server apparatus, whether or not a virtual machine that fulfills target conditions exists by using the target conditions of having a highest required server rank among the plurality of virtual machines and being in an idle state, and selecting a virtual machine that fulfills the target conditions as the target virtual machine when it is determined that the virtual machine that fulfills the target conditions exists, and when it is determined that no virtual machine exists that fulfills the target conditions, selecting, by the target server apparatus, as the target virtual machine, a virtual machine having a lowest required server rank from among the plurality of virtual machines.

* * * * *